(12) United States Patent
Jovicic et al.

(10) Patent No.: US 9,660,727 B2
(45) Date of Patent: May 23, 2017

(54) COHERENT DECODING OF VISIBLE LIGHT COMMUNICATION (VLC) SIGNALS

(71) Applicant: QUALCOMM Incorporated, San Diego, CA (US)

(72) Inventors: Aleksandar Jovicic, Jersey City, NJ (US); Mahadevi Pillai Perumal, Piscataway, NJ (US); Kenneth Vavreck, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 26 days.

(21) Appl. No.: 14/832,259

(22) Filed: Aug. 21, 2015

(65) Prior Publication Data
US 2016/0323035 A1    Nov. 3, 2016

Related U.S. Application Data

(60) Provisional application No. 62/154,012, filed on Apr. 28, 2015.

(51) Int. Cl.
| | | |
|---|---|---|
| *H04B 10/116* | (2013.01) | |
| *H04B 10/079* | (2013.01) | |
| *H04N 5/353* | (2011.01) | |

(52) U.S. Cl.
CPC ....... *H04B 10/116* (2013.01); *H04B 10/0795* (2013.01); *H04N 5/3532* (2013.01)

(58) Field of Classification Search
CPC .................................................... H04B 10/116
See application file for complete search history.

(56) References Cited

U.S. PATENT DOCUMENTS

| | | | | |
|---|---|---|---|---|
| 5,591,952 A | * | 1/1997 | Krichever | .......... G06K 7/10722 235/462.11 |
| 2009/0129781 A1 | * | 5/2009 | Irie | ..................... H04B 10/1125 398/98 |
| 2012/0281987 A1 | | 11/2012 | Schenk et al. | |
| 2014/0045549 A1 | | 2/2014 | Ryan et al. | |
| 2014/0270796 A1 | * | 9/2014 | Jovicic | ................. H04B 10/116 398/128 |
| 2015/0093107 A1 | | 4/2015 | Jovicic et al. | |

FOREIGN PATENT DOCUMENTS

KR    20140118181 A    10/2014

OTHER PUBLICATIONS

Sterckx, K. L., & Saengudomlert, P. (Jul. 20, 2011). Visible Light Communication via Dimmable LED Lamps using Pulses of Equal Shape. 16th European Conference on Networks and Optical Communications (NOC), 48-51. IEEE. ISBN: 978-1-61284-753-5. XP032039768.
International Search Report and Written Opinion—PCT/US2016/025836—ISA/EPO—Jul. 1, 2016—13 pgs.
Rajagopal N., et al., "Visual Light Landmarks for Mobile Devices," Proceedings of the 13th International Symposium on Information Processing in Sensor Networks, 2014, pp. 249-260.

* cited by examiner

*Primary Examiner* — Nathan Curs
(74) *Attorney, Agent, or Firm* — Hunter Clark PLLC

(57) ABSTRACT

Disclosed are methods, systems, devices, apparatus, computer-/processor-readable media, and other implementations, including a method to decode a visible light communication (VLC) signal by capturing images of a light source emitting a light modulated signal comprising a temporal sequence of symbols to determine decoded symbols and to further determine at least one codeword from a list of candidate codewords.

41 Claims, 11 Drawing Sheets

COHERENT DECODING OF VISIBLE LIGHT COMMUNICATION (VLC) SIGNALS

CLAIM OF PRIORITY UNDER 35 U.S.C. §119

The present Application claims the benefit of and priority to U.S. Provisional Application Ser. No. 62/154,012, entitled "COHERENT DECODING OF VISIBLE LIGHT COMMUNICATION (VLC) SIGNALS," and filed Apr. 28, 2015, and expressly incorporated herein by reference.

BACKGROUND

Visible light communication (VLC) involves the transmission of information through modulation of the light intensity of a light source (e.g., the modulation of the light intensity of one or more light emitting diodes (LEDs)). Generally, visible light communication is achieved by transmitting, from a light source such as an LED or laser diode (LD), a modulated visible light signal, and receiving and processing the modulated visible light signal at a receiver (e.g., a mobile device) that includes a photo detector (PD) or array of PDs (e.g., a complementary metal-oxide-semiconductor (CMOS) image sensor (such as a camera)).

By modulating an LED (typically at which the modulation cannot be perceived by a human being) it is possible to transmit data. The distance and position of a receiver from the light source, however, may impact the receiver's ability to correctly demodulate and decode the data communicated from the light source using VLC signals. If the receiver is a distance away from the light source, the receiver may be able to demodulate and decode only a portion of the VLC signal. For example, at long range, only a portion of a captured image may correspond to the image of the light source.

SUMMARY

In some variations, a method to decode a visible light communication (VLC) signal is provided. The method includes capturing an image of a light source emitting a light modulated signal comprising a temporal sequence of symbols, determining a time-domain signal from the captured image, identifying from the time-domain signal an at least one decoded symbol, and determining at least one codeword from a list of candidate codewords based on the identified at least one decoded symbol from the time-domain signal and on an inter-symbol time measured between the at least one decoded symbol and an earlier at least one decoded symbol determined from an earlier time-domain signal from an earlier captured image.

In some variations, a mobile device is provided that includes an image capture unit including a gradual-exposure module configured to capture an image of a light source emitting a light modulated signal comprising a temporal sequence of symbols, memory configured to store the captured image, and one or more processors coupled to the memory and the image capture unit. The one or more processors are configured to determine a time-domain signal from the captured image, identify from the time-domain signal an at least one decoded symbol, and determine at least one codeword from a list of candidate codewords based on the identified at least one decoded symbol from the time-domain signal and on an inter-symbol time measured between the at least one decoded symbol and an earlier at least one decoded symbol determined from an earlier time-domain signal for an earlier captured image.

In some variations, an apparatus is provided that includes means for capturing an image of a light source emitting a light modulated signal comprising a temporal sequence of symbols, the means for capturing including a gradual-exposure module. The apparatus further includes means for determining a time-domain signal from the captured image, means for identifying from the time-domain signal an at least one decoded symbol, and means for determining at least one codeword from a list of candidate codewords based on the identified at least one decoded symbol from the time-domain signal and on an inter-symbol time measured between the at least one decoded symbol and an earlier at least one decoded symbol determined from an earlier time-domain signal for an earlier captured image.

In some variations, a non-transitory computer readable media is provided. The computer readable media is programmed with instructions, executable on a processor, to capture an image of a light source emitting a light modulated signal comprising a temporal sequence of symbols, determine a time-domain signal from the captured image, identify from the time-domain signal an at least one decoded symbol, and determine at least one codeword from a list of candidate codewords based on the identified at least one decoded symbol from the time-domain signal and on an inter-symbol time measured between the at least one decoded symbol and an earlier at least one decoded symbol determined from an earlier time-domain signal for an earlier captured image.

Other and further objects, features, aspects, and advantages of the present disclosure will become better understood with the following detailed description of the accompanying drawings.

BRIEF DESCRIPTION OF THE DRAWINGS

Like reference symbols in the various drawings indicate like elements.

DETAILED DESCRIPTION

Figure 1:
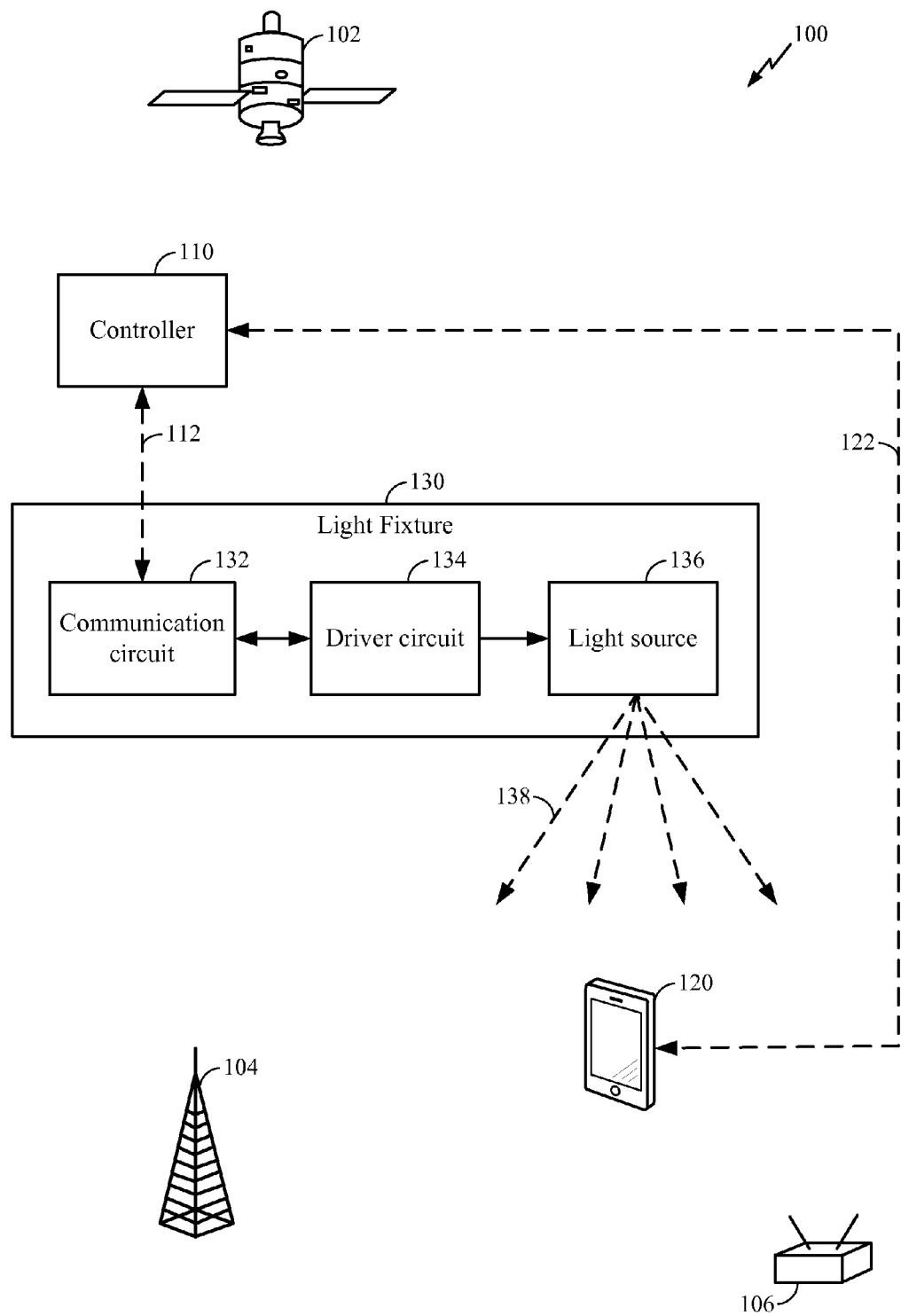
FIG. 1 is a schematic diagram of an example VLC system.

Described herein are methods, systems, devices, apparatus, computer-/processor-readable media, and other implementations for transmission and reception of data using visible light communication (VLC), including a method for decoding a VLC signal that includes capturing, e.g., with an image capture unit including a gradual-exposure module/circuit (for example, a CMOS image sensor with a rolling shutter), an image of a light source emitting a light modulated signal comprising a temporal sequence of symbols, determining a time-domain signal from the captured image, identifying from the time-domain signal an at least one decoded symbol, and determining at least one codeword from a list of candidate codewords based on the identified at least one decoded symbol determined from the time-domain signal and on inter-symbol time measured between the at least one decoded symbol and an earlier at least one decoded symbol for an earlier captured image.

The implementations described herein may be used to decode a transmitted codeword when only one symbol per frame is visible to the camera (or when only a portion of a pulse corresponding to the symbol is visible). In some embodiments, as will be described in greater detail below, a light source repeatedly transmits a codeword comprising a sequence of symbols modulated into the emitted light. The transmitted symbols belong to a pre-defined symbol set, where a symbol has a unique period (duration) distinguishing it from other symbols. A transmitted codeword is assumed to be one of a pre-determined number of possible codewords (where the possible codewords form a codeword dictionary), with the possible codewords each includes a unique combination of sequential symbols selected from the pre-defined symbol set.

To determine the codeword transmitted by the light source, sequential image frames from the light source are captured. In some situations, only a portion of each codeword may be visible and might be decoded at each frame (e.g., only one or more of the symbols of the codeword being sent may be decoded, due to distance from light source or other causes of noise). At each frame that is captured, a determination is made whether the temporal sequence of decoded symbols matches any portion of the possible candidate codewords of the codeword dictionary and whether, for example, the inter-symbol time (between the decoded symbols in one frame, and the decoded symbols of an earlier or the following frame(s)) allows for the location of the matched sequence for a particular codeword. If any candidate codeword does not include the decoded symbol subsequence of the current frame or if the sequence is detected but is not consistent with a predicted inter-symbol time (or some other timing measurement) predicted for the candidate codeword, then that candidate codeword cannot be the codeword being transmitted, and thus that candidate codeword is eliminated from the list of remaining possible candidates. The process is repeated to eliminate candidate codewords; the last remaining candidate is deemed to be the transmitted codeword.

Thus, to continue being a possible candidate codeword (and not be eliminated), a possible candidate codeword should not only contain the symbol sub-sequence decoded at each frame, but the predicted period between two (sometimes different) decoded symbol sub-sequences of different frames (such frames do not necessarily have to be adjacent to each other) have to be consistent with the measured time period between the first of those decoded symbol sub-sequences and the decoded symbol sub-sequence of the other frame. The predicted period between two decoded symbol sub-sequences is computed based on the known pre-defined durations of the symbols and/or known/predicted inter-frame times between frames. Accordingly, the implementations, described herein, enable the determination of a codeword (e.g., representative of an identifier or some other information) encoded in a VLC signal without needing to capture the entirety of the codeword in an image frame.

In some embodiments, the described methods, systems, devices, and other implementations may use rateless VLC, which is a communication method in which a light fixture may repetitively (and in some cases, continually) transmit a codeword representative of information (e.g., an identifier) and a VLC-compatible device, or devices, in the vicinity of the light fixture may receive and decode transmissions of the codeword until enough of the codeword is captured (e.g., over one or more image frames during which the codeword is repeatedly transmitted by the VLC source) so that known information about the decoded symbols (e.g., their known durations) and known information about the possible codewords (defining a finite codeword dictionary) can be used to reconstruct or otherwise derive the codeword. In some situations, only part of the codeword may be captured, with each repetition of the codeword (in sequential frame) providing different decoded symbols constituting the codeword (e.g., if, for example, the receiving device's position with respect to the VLC source is changing). In practice, symbols of the codeword may be lost (erased) due to temporary outages in the VLC link (e.g., as a result of physical obstructions, a change in viewing angle, or as a result of an increase in the distance between the light fixture and a receiver of the VLC-compatible device). As a result, the communication processes and implementations described herein may be said to be "rateless"—i.e., the number of identifiers that need to be transmitted and received in order to reconstruct or otherwise derive the codeword (identifier) may vary.

With reference to FIG. 1, a schematic diagram of an example VLC system 100 is shown. The VLC system 100 includes a controller 110 configured to control the operation/functionality of a light fixture 130, and further includes a mobile device 120 configured to receive and capture light emissions from a light source of the light fixture 130 (e.g., using a light sensor, also referred to as a VLC receiver module, such as the VLC receiver module 512 depicted in FIG. 5), and decode and identify a codeword encoded in the emitted light captured from the light fixture 130. Light emitted by a light source 136 of the light fixture 130 may be controllably modulated to include pulses with timing information (e.g., durations) that vary according to symbols of the codeword to be encoded into the emitted light. As will become apparent below, in some embodiments, visible pulses from repeating codeword frames emitted by the light fixture 130 are captured by an image capture unit of the mobile device 120 and are decoded (in part based on timing information associated with the decoded pulses). The decoded pulses (corresponding to symbol sub-sequences from the codeword transmitted by the light fixture) are used, in conjunction with timing information, to identify the codeword from a pre-determined pool of candidate codewords. For example, decoded symbol sub-sequences, which may include only a single decoded symbol, or a portion of a symbol (e.g., in situations where the symbol encoded in the emitted light from the light source is one associated with a long pulse duration that could not be completely captured by the camera in a particular frame), are obtained from several frames. Because the same codeword(s) is continually transmitted by the light source of the light fixture, a candidate codeword can remain a plausible codeword if that candidate codeword includes each of the decoded symbol sub-sequences. Additionally, the candidate codeword is considered to be a plausible codeword if measured timing information (e.g., inter-symbol time, which may be defined as the period between the end time of a first decoded symbol sub-sequence, and the begin time of a following decoded symbol sub-sequence) is such that it matches predicted timing information for the decoded sub-sequences. The predicted/expected timing information can be computed based on the known predetermined timing information for the symbols comprising the particular codeword for which the predicted timing information is computed. For example, predicted inter-symbol time for a still viable candidate codeword (because it includes all the current decoded symbols) is computed as a sum of symbol pulse durations of symbols appearing in two sequential (back-to-back, or, alternatively, non-adjacent) copies of the codeword between respective occurrences of the decoded symbol sub-sequences.

In some embodiments, the VLC system 100 may include any number of controllers such as the controller 110, mobile devices, such as the mobile device 120, and/or light fixtures, such as the light fixture 130. In some embodiments, the functionality of the controller 110 (or aspects of the controller 110) may be implemented by the mobile device 120. In such embodiments the mobile device 120 may communicate directly with the light fixture 130.

As further shown in FIG. 1, the light fixture 130 includes, in some embodiments, a communication circuit 132 to communicate with, for example, the controller 110 (via a link or channel 112, which may be a WiFi link, a link established over a power line, a LAN-based link, etc.), a driver circuit 134, and/or a light source 136. In some embodiments, the communication circuit 132 may include one or more transceivers, implemented according to any one or more of communication technologies and protocols, including IEEE 802.11 (WiFI) protocols, near field technologies (e.g., Bluetooth® wireless technology network, ZigBee, etc.), cellular WWAN technologies, etc., and may also be part of a network (a local area network (LAN), a wireless LAN (WLAN), a wide area network (WAN), a wireless WAN (WWAN), etc.) assigned with a unique network address (e.g., an IP address). In some embodiments, the communication circuit 132 may be implemented to enable wired communication, and may thus be connected to the controller 110 via a physical communication link. The controller 110 may in turn be a network node in a communication network to enable network-wide communication to and from the light fixture 130. In some implementations, the controller may be realized as part of the communication circuit 132. In some embodiments, the controller may be configured to set/reset the codeword at each of the light fixtures. A light fixture may have a sequence of codewords, and the controller may be configured to provide a control signal to cause the light fixture to cycle through its list of codewords. Alternatively and/or additionally, in some embodiments, light fixtures may be addressable so that a controller (such as the controller 110 of FIG. 1) may access a particular light fixture to provide instructions, new code words, light intensity, frequency, and other parameters for any given fixture.

In some examples, the light source 136 may include one or more light emitting diodes (LEDs) and/or other light emitting elements. In some configurations, a single light source or a commonly controlled group of light emitting elements may be provided (e.g., a single light source, such as the light source 136 of FIG. 1, or a commonly controlled group of light emitting elements may be used for ambient illumination and VLC signal transmissions). In other configurations, the light source 136 may be replaced with multiple light sources or separately controlled groups of light emitting elements (e.g., a first light source may be used for ambient illumination, and a second light source may be used for VLC signal transmissions).

The driver circuit 134 (e.g., an intelligent ballast) may be configured to drive the light source 136. For example, the driver circuit 134 may be configured to drive the light source 136 using a current signal and/or a voltage signal to cause the light source to emit light modulated to encode information representative of a codeword that the light source 136 is to communicate. As such, the driver circuit may be configured to output electrical power according to a pattern that would cause the light source to controllably emit light modulated with a desired codeword (e.g., an identifier). In some implementations, some of the functionality of the driver circuit 134 may be implemented at the controller 110.

By way of example, the controller 110 may be implemented as a processor-based system (e.g., a desktop computer, server, portable computing device or wall-mounted control pad). As noted, at least some of the functionality of the controller 110 may be provided by the mobile device 120. For example, controlling signals to control the driver circuit 134 may be communicated from the mobile device 120 to the controller 110 via, for example, a wireless communication link/channel 122, and the transmitted controlling signals may then be forwarded to the driver circuit 134 via the communication circuit 132 of the fixture 130. In some embodiments, the controller 110 may also be implemented as a switch, such as an ON/OFF/dimming switch. A user may control performance attributes/characteristics for the light fixture 130, e.g., an illumination factor specified as, for example, a percentage of dimness, via the controller 110, which illumination factor may be provided by the controller 110 to the light fixture 130. In some examples, the controller 110 may provide the illumination factor to the communication circuit 132 of the light fixture 130. By way of example, the illumination factor, or other controlling parameters for the performance behavior of the light fixture and/or communications parameters, timing, identification and/or behavior, may be provided to the communication circuit 132 over a power line network, a wireless local area network (WLAN; e.g., a Wi-Fi network), and/or a wireless wide area network (WWAN; e.g., a cellular network such as a Long Term Evolution (LTE) or LTE-Advanced (LTE-A) network).

In some embodiments, the controller 110 may also provide the light fixture 130 with a codeword (e.g., an identifier) for repeated transmission using VLC. The controller 110 may also be configured to receive status information from the light fixture 130. The status information may include, for example, a light intensity of the light source 136, a thermal performance of the light source 136, and/or the codeword (or identifying information) assigned to the light fixture 130.

The mobile device 120 may be implemented, for example, as a mobile phone or tablet computer, and may be configured to communicate over different access networks, such as other WLANs and/or WWANs and/or personal area networks (PANs). In some embodiments, the mobile device may communicate uni-directionally or bi-directionally with the controller 110. As noted, the mobile device 120 may also communicate directly with the light fixture 130.

When the light fixture 130 is in an ON state, the light source 136 may provide ambient illumination 138 which may be captured by an image capturing unit (also referred to as an image sensor), e.g., a camera, such as a CMOS camera, a charge-couple device (CCD)-type camera, etc., of the mobile device 120. In some embodiments, the camera (image capture unit) may be implemented with a rolling shutter mechanism configured to capture image data from a scene over some time period by scanning the scene vertically or horizontally so that different areas of the captured image correspond to different time instances. The light source 136 may also emit VLC signal transmissions that may be captured by the image sensor of the mobile device 120. As described herein, the illumination and/or VLC signal transmissions may be used by the mobile device 120 for navigation and/or other purposes.

As also shown in FIG. 1, the VLC system 100 may be configured for communication with one or more different types of wireless communication systems or nodes. Such nodes, also referred to as wireless access points (or WAPs) may include LAN and/or WAN wireless transceivers, including, for example, WiFi base stations, femto cell transceivers, Bluetooth® wireless technology transceivers, cellular base stations, WiMax transceivers, etc. Thus, for example, one or more Local Area Network Wireless Access Points (LAN-WAPs), such as a LAN-WAP 106, may be used to enable wireless voice and/or data communication with the mobile device 120 and/or the light fixture 130 (e.g., via the controller 110). The LAN-WAP 106 may also be utilized, in some embodiments, as an independent source (possibly together with other network nodes) of position data, e.g., through implementation of trilateration-based procedures based, for example, on time of arrival, round trip timing (RTT), received signal strength (RSSI) and other wireless signal-based location techniques. The LAN-WAP 106 can be part of a Wireless Local Area Network (WLAN), which may operate in buildings and perform communications over smaller geographic regions than a WWAN. Additionally, in some embodiments, the LAN-WAP 106 could also be pico or femto cell that is part of a WWAN network. In some embodiments, the LAN-WAP 106 may be part of, for example, WiFi networks (802.11x), cellular piconets and/or femtocells, Bluetooth® wireless technology Networks, etc. The LAN-WAPs 106 can also form part of an indoor positioning system.

The VLC system 100 may also be configured for in communication with one or more Wide Area Network Wireless Access Points, such as a WAN-WAP 104 depicted in FIG. 1, which may be used for wireless voice and/or data communication, and may also serve as another source of independent information through which the mobile device 120, for example, may determine its position/location. The WAN-WAP 104 may be part of a wide area wireless network (WWAN), which may include cellular base stations, and/or other wide area wireless systems, such as, for example, WiMAX (e.g., 802.16), femtocell transceivers, etc. A WWAN may include other known network components which are not shown in FIG. 1. Typically, the WAN-WAP 104 within the WWAN may operate from fixed positions, and provide network coverage over large metropolitan and/or regional areas.

Communication to and from the controller 110, the mobile device 120, and/or the fixture 130 (to exchange data, facilitate position determination for the device 120, etc.) may thus be implemented, in some embodiments, using various wireless communication networks such as a wide area wireless network (WWAN), a wireless local area network (WLAN), a wireless personal area network (WPAN), and so on. The term "network" and "system" may be used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 802.16), Long Term Evolution (LTE), and other wide area network standards. A CDMA network may implement one or more radio access technologies (RATs) such as cdma2000, Wideband-CDMA (W-CDMA), and so on. Cdma2000 includes IS-95, IS-2000, and/or IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may also be an IEEE 802.11x network, and a WPAN may be a Bluetooth® wireless technology network, an IEEE 802.15x, or some other type of network. The techniques described herein may also be used for any combination of WWAN, WLAN and/or WPAN.

As further shown in FIG. 1, in some embodiments, the controller 110, the mobile device 120, and/or the light fixture 130 may also be configured to at least receive information from a Satellite Positioning System (SPS) that includes a satellite 102, which may be used as an independent source of position information for the mobile device 120 (and/or for the controller 110 or the fixture 130). The mobile device 120, for example, may thus include one or more dedicated SPS receivers specifically designed to receive signals for deriving geo-location information from the SPS satellites. Transmitted satellite signals may include, for example, signals marked with a repeating pseudo-random noise (PN) code of a set number of chips and may be located on ground based control stations, user equipment and/or space vehicles. The techniques provided herein may be applied to or otherwise enabled for use in various systems, such as, e.g., Global Positioning System (GPS), Galileo, Glonass, Compass, Quasi-Zenith Satellite System (QZSS) over Japan, Indian Regional Navigational Satellite System (IRNSS) over India, Beidou, etc., and/or various augmentation systems (e.g., a Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

Thus, in some embodiments, the mobile device 120 may communicate with any one or a combination of the SPS satellites (such as the satellite 102), WAN-WAPs (such as the WAN-WAP 104), and/or LAN-WAPs (such as the LAN-WAP 106). In some embodiments, each of the aforementioned systems can provide an independent information estimate of the position for the mobile device 120 using different techniques. In some embodiments, the mobile device may combine the solutions derived from each of the different types of access points to improve the accuracy of the position data. Location information obtained from RF transmissions may supplement or used independently of location information derived, for example, based on data determined from decoding the VLC signal provided by the light fixture 130 (through emissions from the light source 136), as will described in greater details below.

Figure 2:
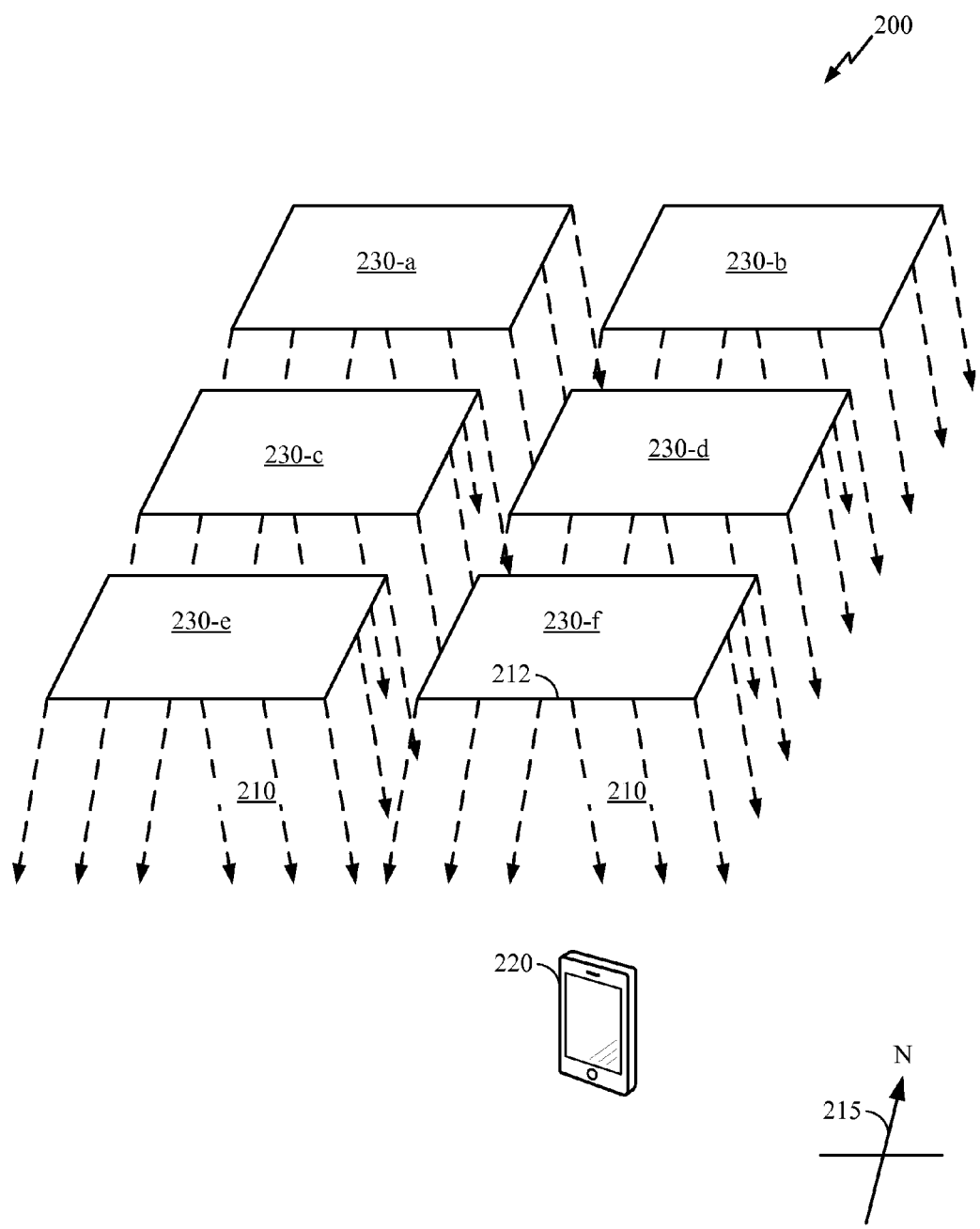
FIG. 2 is a diagram of another example VLC system with multiple light fixtures.

With reference now to FIG. 2, a diagram of an example system 200 is shown. The system 200 includes a mobile device 220 (which may be similar in configuration and/or functionality to the mobile device 120 of FIG. 1) positioned near (e.g., below) a number of light fixtures 230-*a*, 230-*b*, 230-*c*, 230-*d*, 230-*e*, and 230-*f*. The light fixtures 230-*a*, 230-*b*, 230-*c*, 230-*d*, 230-*e*, and 230-*f* may, in some cases, be examples of aspects of the light fixture 130 described with reference to FIG. 1. The light fixtures 230-*a*, 230-*b*, 230-*c*, 230-*d*, 230-*e*, and 230-*f* may, in some examples, be overhead light fixtures in a building (or overhead street/area lighting out of doors), which may have fixed locations with respect to a reference (e.g., a global positioning system (GPS) coordinate system and/or building floor plan). In some embodiments, the light fixtures 230-*a*, 230-*b*, 230-*c*, 230-*d*, 230-*e*, and 230-*f* may also have fixed orientations with respect to a reference (e.g., a meridian passing through magnetic north 215).

As the mobile device 220 moves (or is moved) under one or more of the light fixtures 230-*a*, 230-*b*, 230-*c*, 230-*d*, 230-*e*, and 230-*f*, an image capture unit of the mobile device 220 may receive light 210 emitted by one or more of the light fixtures 230-*a*, 230-*b*, 230-*c*, 230-*d*, 230-*e*, and 230-*f* and capture an image of part or all of one or more of the light fixtures 230-*a*, 230-*b*, 230-*c*, 230-*d*, 230-*e*, and 230-*f*. The captured image may include an illuminated reference axis, such as the illuminated edge 212 of the light fixture 230-*f*. Such illuminated edges may enable the mobile device to determine its location and/or orientation with reference to one or more of the light fixtures 230-*a*, 230-*b*, 230-*c*, 230-*d*, 230-*e*, and 230-*f*. Alternatively or additionally, the mobile device 220 may receive, from one or more of the light fixtures 230-*a*, 230-*b*, 230-*c*, 230-*d*, 230-*e*, and 230-*f*, VLC signal transmissions that include codewords (comprising symbols), such as identifiers, of one or more of the light fixtures 230-*a*, 230-*b*, 230-*c*, 230-*d*, 230-*e*, and/or 230-*f*. The received codewords may be used to generally determine a location of the mobile device 220 with respect to the light fixtures 230-*a*, 230-*b*, 230-*c*, 230-*d*, 230-*e*, and 230-*f*, and/or to look up locations of one or more of the light fixtures 230-*a*, 230-*b*, 230-*c*, 230-*d*, 230-*e*, and 230-*f* and determine, for example, a location of the mobile device 220 with respect to a coordinate system and/or building floor plan. Additionally or alternatively, the mobile device 220 may use the locations of one or more of the light fixtures 230-*a*, 230-*b*, 230-*c*, 230-*d*, 230-*e*, and 230-*f*, along with captured images (and known or measured dimensions and/or captured images of features, such as corners or edges) of the light fixtures 230-*a*, 230-*b*, 230-*c*, 230-*d*, 230-*e*, and 230-*f*, to determine a more precise location and/or orientation of the mobile device 220. Upon determining the location and/or orientation of the mobile device 220, the location and/or orientation may be used for navigation by the mobile device 220.

Figure 3A:
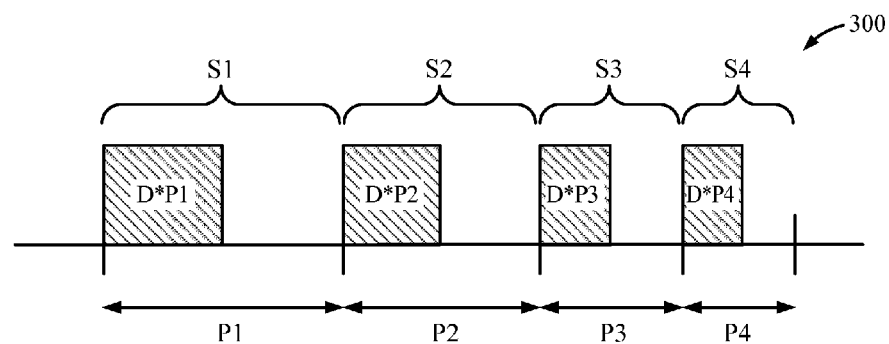
FIGS. 3A-D are diagrams of example VLC signals.

As noted, a light source (such as the light source 136 of the light fixture 130 described with reference to FIG. 1, or any of the light sources or fixtures depicted in FIG. 2) may transmit a VLC signal in which an identifier codeword (or some other codeword) associated with the light fixture (or light source) 130 may be encoded. An identifier, or some other codeword, associated with the light source 136 and/or light fixture 130, may be encoded in a VLC signal in various ways. For example, an identifier may be encoded in a VLC signal as a time sequence of symbols, e.g., as a pulse position modulated sequence of digital pulses, with the pulse positions and timing information being representative of data. For example, in some embodiments, the symbols for a codeword may be encoded using timing information defining a multi-symbol pulse alphabet. An example 4-symbol alphabet comprising the symbols {S1, S2, S3, S4} may be associated with respective pulse periods {P1, P2, P3, P4}. For example, the symbols {S1, S2, S3, S4} may be represented according to respective pulse durations {576 µs, 468 µs, 364 µs, 260 µs}. Other period values may be used instead of those provided in the accompanying example. In some embodiments, other symbol encoding, such as by varying frequency or amplitude may also be utilized. In some embodiments, symbol encoding may be selected to be independent of other lighting attributes such as lighting/dimming level. In an embodiment, period values and/or signal encoding may be selected to not be visible to the human eye while remaining detectable from an image capture unit. In some embodiments, during the time interval corresponding to each symbol period, the signal is logically "ON" for some amount of time and "OFF" for some amount of time. The duration of ON time may be controlled, e.g., by a controller such as the controller 110 depicted in FIG. 1, through a parameter D (the duty cycle) which may be a function of the dimming input setting. In some embodiments, signal encoding may interact with lighting parameters such as dimming, for greater compatibility or for greater detectability, for example, by extending durations when lights are operated at lower light levels or by reducing time between successive symbols or by increasing symbol frequency or by increasing symbol amplitude when operating lights at a higher lighting level. FIG. 3A includes a diagram 300 of example pulses representing different symbols of a symbol alphabet. As shown, in this example the different symbols are associated with different pulse widths that enable uniquely identifying (and thus decoding) a symbol according to the detected pulse width. It is to be noted that, in some embodiments, the pulses may have a positive polarity (i.e., a logical "1" will correspond to a pulse above a certain voltage level), while in some other embodiments the pulses may have a negative polarity (i.e., a logical "1" will correspond to a pulse under a certain threshold level). A codeword is then defined as a time-based sequence of symbols from the predefined symbol alphabet. For example, a codeword C1 may be defined as a sequence of five symbols comprising (S1, S3, S1, S2, S4). Other codewords will have different combinations of symbols from the particular symbol alphabet. In an embodiment, a codeword could also be defined by the position of an imperfect sequence (e.g., a sequence including blank or missing symbols) of two or more symbols within a period allocated to a codeword or by the position of a single symbol within a period allocated to a codeword. A light fixture driver would cause the light source to which it is connected to repeatedly transmit (through light emissions) the particular codeword(s) that that light fixture is assigned to transmit. In some embodiments, transmission of the particular codeword by the light source may be preceded by transmission of a VLC synchronization signal (synchronization signals may also be interspersed with the continual transmission of the particular codeword).

Figure 3B:
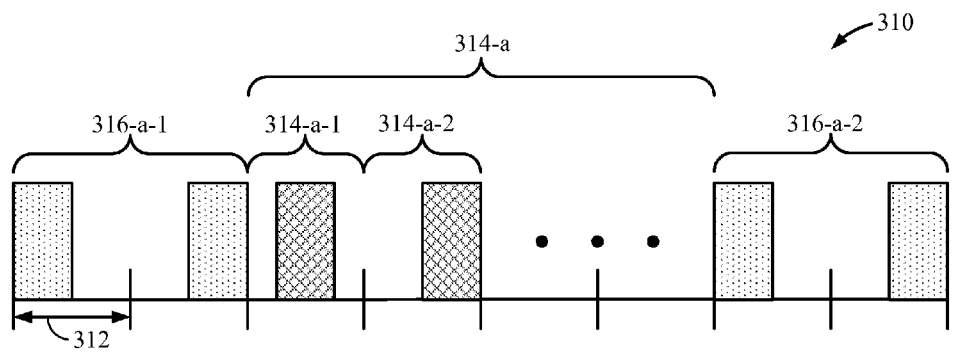
Figure 3C:
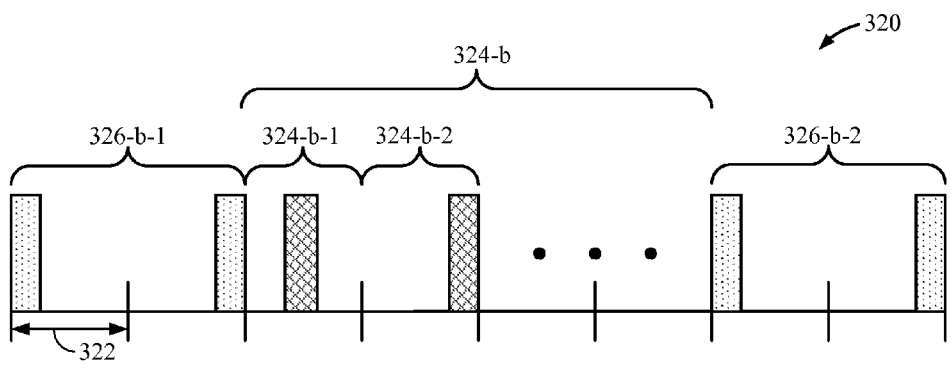
Figure 3D:
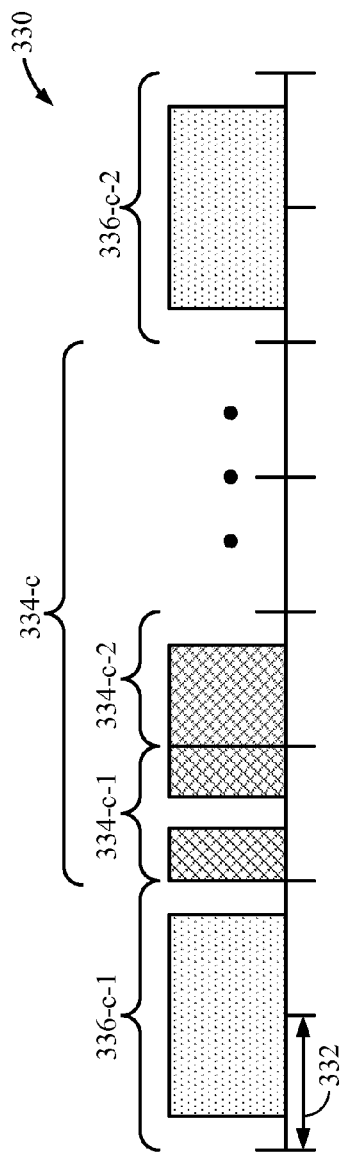

FIGS. 3B, 3C, and 3D show examples of VLC signals comprising binary symbols (i.e., a two-symbol alphabet) in which codewords are encoded using pulse position modulation according to different duty cycles. By way of example, the VLC signal 310 shown in FIG. 3B has a duty cycle of 50%, the VLC signal 320 shown in FIG. 3C has a duty cycle of 25%, and the VLC signal 330 shown in FIG. 3D has a duty cycle of 75%. The duty cycle with which the VLC signals 310, 320, or 330 are transmitted may depend on the percentage of dimness selected, for example, for a light source 136 and/or light fixture 130.

Particularly, with further reference to FIG. 3B, the VLC signal 310 may have a duty cycle of 50% and include positive polarity pulses. Each pulse may be confined to one of a number of time slots 312. A number of pulses of the VLC signal 310 may define an instance 314-a of an identifier (codeword). By way of example, the instance 314-a of the identifier may be preceded by two consecutive pulses defining a synchronization signal 316-a-1. The first pulse of the synchronization signal 316-a-1 may be aligned with the beginning of its timeslot, and the second pulse of the synchronization signal 316-a-1 may be aligned with the end of its timeslot.

Following the pulses of the synchronization signal are a number of symbols. In the example shown in FIG. 3B, the symbols may be pulse position modulated. For example, some of the symbols (e.g., symbol 314-a-2) may define logic "0" symbols and may be aligned with the ends of their timeslots. Other symbols (e.g., symbol 314-a-1) may define logic "1" symbols and may be centered within their timeslots. As shown, a spacing in time between the two consecutive pulses of the synchronization signal 316-a-1 may differ from both: 1) a spacing in time between any two sequential pulses of the identifier 314-a, and 2) a spacing in time between a pulse of the synchronization signal 316-a-1 and a pulse of the identifier 314-a. This may enable a VLC-compatible device to detect the synchronization signal 316-a-1 from amongst the symbols of sequential identifiers.

Following the symbols of the instance 314-a of the identifier, another instance of the identifier may be transmitted, such that instances of the identifier may be transmitted back-to-back, regardless of VLC frame boundaries. However, the next instance of the identifier may, in some cases, be preceded with a next instance of the synchronization signal.

Turning to FIG. 3C, the VLC signal 320 may have a duty cycle of 25% and include positive polarity pulses. Each pulse may be confined to one of a number of timeslots 322. A number of pulses of the VLC signal 320 may define an instance 324-b of an identifier (or some other codeword). By way of example, the instance 324-b of the identifier may be preceded by two consecutive pulses defining a synchronization signal 326-b-1. Similarly to the VLC signal 310 with the duty cycle of 50%, the first pulse of the synchronization signal 326-b-1 may be aligned with the beginning of its timeslot, and the second pulse of the synchronization signal 326-b-1 may be aligned with the end of its timeslot.

Following the pulses of the synchronization signal are a number of symbols. In the example shown, the symbols may be pulse position modulated. For example, some of the symbols (e.g., symbol 324-b-2) may define logic "0" symbols and may be aligned with the ends of their timeslots. Other symbols (e.g., symbol 324-b-1) may define logic "1" symbols and may be centered within their timeslots. As shown, a spacing in time between the two pulses of the synchronization signal 326-b-1 may differ from both: 1) a spacing in time between any two pulses of the identifier 324-b, and 2) a spacing in time between a pulse of the synchronization signal 326-b-1 and a pulse of the identifier 324-b. This may enable a VLC-compatible device to detect the synchronization signal 326-b-1 from amongst the symbols of consecutive identifiers. Following the symbols of the instance 324-b of the identifier, another instance of the identifier may be transmitted, such that instances of the identifier may be transmitted back-to-back, regardless of VLC frame boundaries. However, the next instance of the identifier may, in some cases, be preceded with a next instance of the synchronization signal.

Turning to FIG. 3D, the VLC signal 330 may have, for example, a duty cycle of 75% and include negative polarity pulses. In some embodiments, the duty cycle may be varied. Each pulse may be confined to one of a number of timeslots 332. A number of pulses of the VLC signal 330 may define an instance 334-c of a codeword (e.g., identifier). By way of example, the instance 334-c of the identifier may be preceded by two pulses defining a synchronization signal 336-c-1. Similarly to the VLC signals 310 and 320, with duty cycles of 50% and 25%, respectively, the first pulse of the synchronization signal 336-c-1 may be aligned with the beginning of its timeslot, and the second pulse of the synchronization signal 336-c-1 may be aligned with the end of its timeslot. However, instead of the pulses being positive polarity pulses, the pulses of the VLC signal 330 may be negative polarity pulses. One reason for the switch in polarity is to prevent or inhibit the spacing between the pulses from becoming less than (or indistinguishable from) the spacing between the pulses of any two sequential symbols of the codeword (identifier) 334-c.

Following the pulses of the synchronization signal are a number of symbols. In the example shown, the symbols may be pulse position modulated. For example, some of the symbols (e.g., symbol 334-c-2) define logic "0" symbols and may be aligned with the ends of their timeslots. Other symbols (e.g., symbol 334-c-1) define logic "1" symbols and may be centered within their timeslots. As shown, a spacing in time between the two consecutive pulses of the synchronization signal 336-c-1 may differ from both: 1) a spacing in time between any two consecutive pulses of the identifier 334-c, and 2) a spacing in time between a pulse of the synchronization signal 336-c-1 and a pulse of the codeword (identifier) 334-c. This may enable a VLC-compatible device to detect the synchronization signal 336-c-1 from amongst the symbols of consecutive identifiers. Following the symbols of the instance 334-c of the codeword (identifier), another instance of the codeword may be transmitted, such that instances of the codeword may be transmitted back-to-back, regardless of VLC frame boundaries. However, the next instance of the identifier may in some cases begin with a next instance of the synchronization signal.

Figure 4:
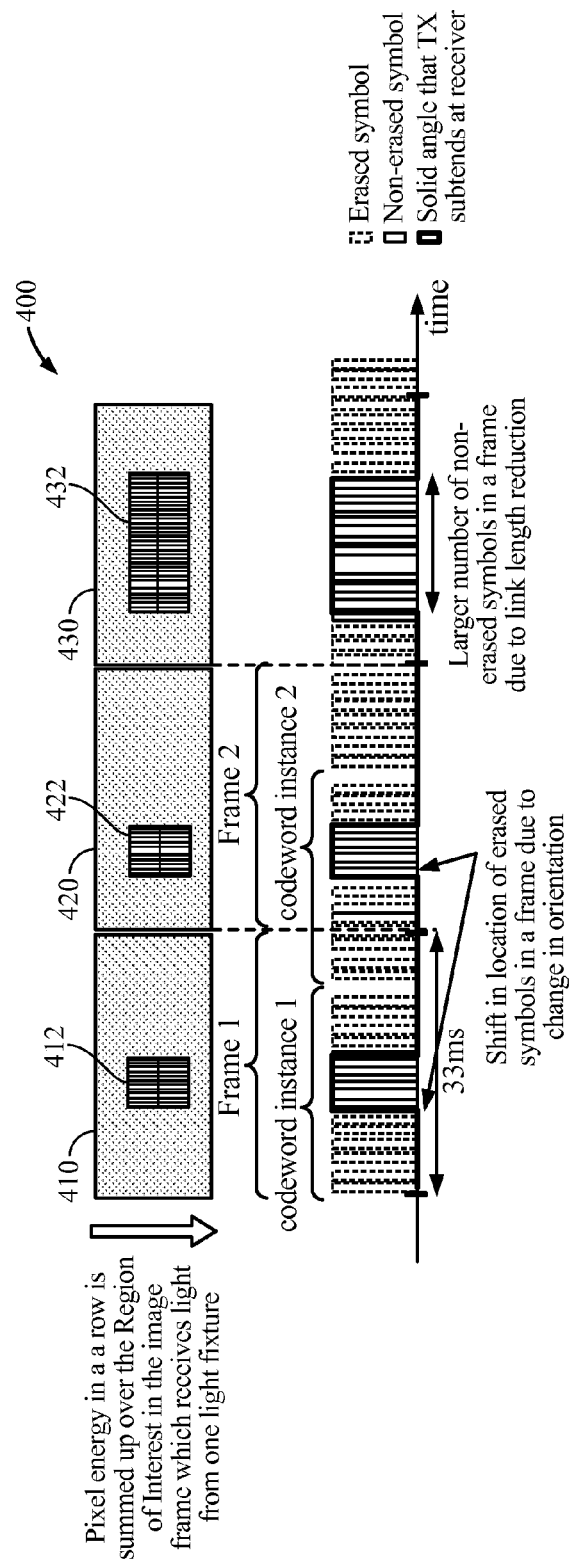
FIG. 4 is a diagram of images, captured over three (3) frames, that include a light source transmitting an encoded VLC signal.

As noted, a receiving device (e.g., a mobile phone, such as the device 120 of FIG. 1, or some other mobile device) uses its image capture unit, which is equipped with a gradual-exposure module/circuit (e.g., a rolling shutter), to capture a portion of, or all of, a transmission frame of the light source (during which part of, or all of, the codeword the light source is configured to communicate is transmitted). An image capture unit employing a rolling shutter, or another type of gradual-exposure mechanism, captures an image over some predetermined time interval such that different rows in the frame are captured at different times, with the time associated with the first row of the image and the time associated with the last row of the image defining a frame period. In embodiments in which the mobile device is not stationary, the portion of a captured image corresponding to the light emitted from the light source will vary. For example, with reference to FIG. 4, a diagram 400 illustrating captured images, over three separate frames, of a scene that includes a light source emitting a VLC signal, is shown. Because the receiving device's spatial relationship relative to the light source varies over the three frames (e.g., because the device's distance to the light source is changing, and/or because the device's orientation relative to the light source is changing, etc.), the region of interest in each captured image will also vary. In the example of FIG. 4, variation in the size and position of the region of interest in each of the illustrated captured frames may be due to a change in the orientation of the receiving device's image capture unit relative to the light source (the light source is generally stationary). Thus, for example, in a first captured frame 410 the image capture unit of the receiving device is at a first orientation (e.g., angle and distance) relative to the light source that enables it to capture a region of interest, corresponding to the light source, with first dimensions 412 (e.g., size and/or position). At a subsequent time interval, corresponding to a second transmission frame for the light source (during which the same codeword may be communicated), the receiving device has changed its orientation relative to the light source, and, consequently, the receiving device's image capture unit captures a second image frame 420 in which the region of interest corresponding to the light source has second dimensions 422 (e.g., size and/or a position) different from the first dimensions of the region of interest in the first frame 410. During a third time interval, in which the receiving device may again have changed its orientation relative to the light source, a third image frame 430, that includes a region of interest corresponding to the light source, is captured, with the region of interest including third dimensions 432 that are different (due to the change in orientation of the receiving device and its image capture unit relative to the light source) from the second dimensions.

Thus, as can be seem from the illustrated region of interest in each of the captured frames 410, 420, and 430 of FIG. 4, the distance and orientation of the mobile image sensor relative to the transmitter (the light source) impacts the number and position of symbol erasures per frame. At long range, it is possible that all but a single symbol per frame is erased (even the one symbol observed may have been partially erased). As will become apparent below, the implementations described herein may enable decoding of a transmitted codeword even when only one symbol per frame is visible to the image capture unit. In some embodiments, temporary outages in a VLC link (e.g., due to physical obstructions of field of view) may also cause a fading in which some of the symbols of a codeword (or a synchronization signal associated with an codeword) are not detected by the VLC-compatible device.

Figure 5:
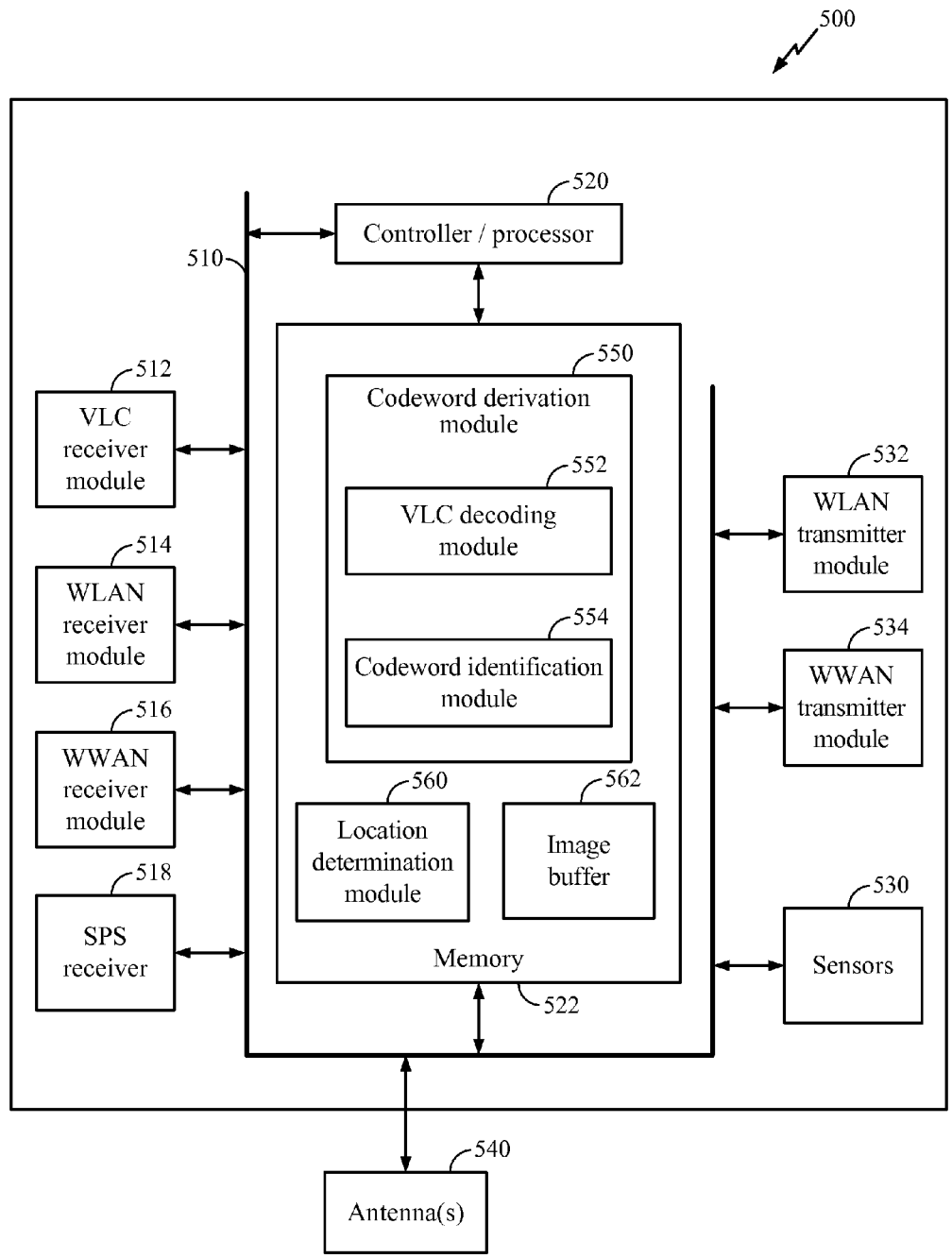
FIG. 5 is a block diagram of an example device configured to capture an image(s) of a light source transmitting a VLC signal, and to determine a codeword encoded into the signals.

With reference now to FIG. 5, a block diagram of an example device 500 (e.g., a mobile device, such as a cellular phone) configured to capture an image(s) of a light source transmitting VLC signals corresponding to as assigned codeword, and to determine from the captured image the assigned codeword, is shown. The device 500 may be similar in implementation and/or functionality to the devices 120 or 220 of FIGS. 1 and 2. For the sake of simplicity, the various features/components/functions illustrated in the schematic boxes of FIG. 5 are connected together using a common bus 510 to represent that these various features/components/functions are operatively coupled together. Other connections, mechanisms, features, functions, or the like, may be provided and adapted as necessary to operatively couple and configure a portable wireless device. Furthermore, one or more of the features or functions illustrated in the example of FIG. 5 may be further subdivided, or two or more of the features or functions illustrated in FIG. 5 may be combined. Additionally, one or more of the features, components, or functions illustrated in FIG. 5 may be excluded. In some embodiments, some or all of the components depicted in FIG. 5 may also be used in implementations of one or more of the light fixture 130 and/or the controller 110 depicted in FIG. 1, or may be used with any other device or node described herein.

As noted, the assigned codeword, encoded into repeating VLC signals transmitted by the light source (such as the light source 136 of the light fixture 130 of FIG. 1) may include, for example, an identifier codeword to identify the light fixture (the light source may be associated with location information, and thus, identifying the light source may enable position determination for the receiving device). As shown, in some implementations, the device 500 may include receiver modules, a controller/processor module 520 to execute application modules (e.g., software-implemented modules stored in a memory storage device 522), and/or transmitter modules. Each of these components may be in communication (e.g., electrical communication) with each other. The components/units/modules of the device 500 may, individually or collectively, be implemented using one or more application-specific integrated circuits (ASICs) adapted to perform some or all of the applicable functions in hardware. Alternatively and/or additionally, functions of the device 500 may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs). The functions of each unit may also be implemented, in whole or in part, with instructions embodied in a memory, formatted to be executed by one or more general or application-specific processors. The receiving device 500 may have any of various configurations, and may in some cases be or include a cellular device (e.g., a smartphone), a computer (e.g., a tablet computer), a wearable device (e.g., a watch or electronic glasses), a module or assembly associated with a vehicle or robotic machine (e.g., a module or assembly associated with a forklift or vacuum cleaner), etc. In some embodiments, the device 500 may have an internal power supply (not shown), such as a small battery, to facilitate mobile operation. Further details about an example implementation of a processor-based device which may be used to realize, at least in part, the device 500, is provided below with respect to FIG. 11.

As further shown in FIG. 5, the receiver modules may include a VLC receiver module 512, also referred to as an image capture unit, configured to receive a VLC signal (e.g., from a light source such as the light source 136 of FIG. 1, or from the light sources of any of the light fixtures 230-a-f depicted in FIG. 2). In some implementations, the image capture unit 512 may include a photo detector (PD) or array of PDs, e.g., a complementary metal-oxide-semiconductor (CMOS) image sensor (e.g., camera), a charge couple device, or some other sensor-based camera. In some embodiments, the image capture unit may be implemented as a gradual-exposure image capture unit, e.g., a rolling shutter image sensor. In such embodiments, the image sensor captures an image over some predetermined time interval such that different rows in the frame are captured at different times. The image capture unit 512 may be used to receive, for example, one or more VLC signals in which one or more identifiers are encoded. An image captured by the image capture unit 512 may be stored in a buffer such as an image buffer 562 which may be a part of the memory 522 schematically illustrated in FIG. 5.

Additional receiver modules/circuits that may be used instead of, or in addition to, the VLC receiver module 512 may include one or more radio frequency (RF) receiver modules/circuits/controllers that are connected to one or more antennas 540. For example, the device 500 may include a wireless local area network (WLAN) receiver module 514 configured to enable, for example, communication according to IEEE 802.11x (e.g., a Wi-Fi receiver). In some embodiments, two or more VLC receiver modules 512 could be used, either in concert or separately, to reduce the number of erased symbols and/or to improve VLC-based communication from a variety of orientations, for example, by using both front and back mounted image capture units 512 on a mobile device such as any of the mobile devices 120, 220, and/or 500 described herein. In some embodiments, the WLAN receiver 514 may be configured to communicate with other types of local area networks, personal area networks (e.g., Bluetooth® wireless technology networks), etc. Other types of wireless networking technologies may also be used including, for example, Ultra Wide Band, ZigBee, wireless USB, etc. In some embodiments, the device 500 may also include a wireless wide area network (WWAN) receiver module 516 comprising suitable devices, hardware, and/or software for communicating with and/or detecting signals from one or more of, for example, WWAN access points and/or directly with other wireless devices within a network. In some implementations, the WWAN receiver may comprise a CDMA communication system suitable for communicating with a CDMA network of wireless base stations. In some implementations, the WWAN receiver module 516 may enable communication with other types of cellular telephony networks, such as, for example, TDMA, GSM, WCDMA, LTE, etc. Additionally, any other type of wireless networking technologies may be used, including, for example, WiMax (802.16), etc. In some embodiments, an SPS receiver 518 (also referred to as a global navigation satellite system (GNSS) receiver) may also be included with the device 500. The SPS receiver 518, as well as the WLAN receiver module 514 and the WWAN receiver module 516, may be connected to the one or more antennas 540 for receiving RF signals. The SPS receiver 518 may comprise any suitable hardware and/or software for receiving and processing SPS signals. The SPS receiver 518 may request information as appropriate from other systems, and may perform computations necessary to determine the position of the mobile device 518 using, in part, measurements obtained through any suitable SPS procedure.

In some embodiments, the device 500 may also include one or more sensors 530 such as an accelerometer, a gyroscope, a geomagnetic (magnetometer) sensor (e.g., a compass), any of which may be implemented based on micro-electro-mechanical-system (MEMS), or based on some other technology. Directional sensors such as accelerometers and/or magnetometers may, in an embodiment, be used to determine the device orientation relative to the light fixture(s) 130, or used to select between multiple image capture units (e.g., VLC receiver module 512). Other sensors that may be included with the device 500 may include an altimeter (e.g., a barometric pressure altimeter), a thermometer (e.g., a thermistor), an audio sensor (e.g., a microphone) and/or other sensors. The output of the sensors may be provided as part of the data based on which operations, such as location determination and/or navigation operations, may be performed.

In some examples, the device 500 may include one or more RF transmitter modules connected to the antennas 540, and may include one or more of, for example, a WLAN transmitter module 532 (e.g., a Wi-Fi transmitter module, a Bluetooth® wireless technology networks transmitter module, and/or a transmitter module to enable communication with any other type of local or near-field networking environment), a WWAN transmitter module 534 (e.g., a cellular transmitter module such as an LTE/LTE-A transmitter module), etc. The WLAN transmitter module 532 and/or the WWAN transmitter module 534 may be used to transmit, for example, various types of data and/or control signals (e.g., to the controller 110 connected to the light fixture 130 of FIG. 1) over one or more communication links of a wireless communication system. In some embodiments, the transmitter modules and receiver modules may be implemented as part of the same module (e.g., a transceiver module), while in some embodiments the transmitter modules and the receiver modules may each be implemented as dedicated independent modules.

The controller/processor module 520 is also configured to manage various functions and operations related to VLC and/or RF communications, including decoding VLC signals (e.g., to determine symbol sub-sequences in one or more captured frames), and determine a codeword, from a pool of possible codewords, that includes the decoded symbol sub-sequences and satisfies timing constraints (e.g., inter-symbol constraints) associated with the symbol sub-sequences. As shown, in some embodiments, the controller 520 may be in communication (e.g., directly or via the bus 510) with a memory device 522 which includes a codeword derivation module 550. The codeword derivation module 550 may include a VLC decoding module 552 configured to decode/extract pulse patterns encoded in a received VLC signal, and a codeword identification module 554. As illustrated in FIG. 5, an image captured by the image capture unit 512 may be stored in the image buffer 562, and processing operations performed by the codeword derivation module 550 may be performed on the data of the captured image stored in the image buffer 562. Each of these components may be in communication with each other, or may be implemented as a single module incorporating the operations of the modules 552 and 554. Furthermore, in some embodiments, each of these modules (550, 552, and/or 554) may be implemented as a hardware realization, a software realization (e.g., as processor-executable code stored on non-transitory storage medium such as volatile or non-volatile memory, which in FIG. 5 is depicted as the memory storage device 522), or as a hybrid hardware-software realization. The controller 520 may be implemented as a general processor-based realization, or as a customized processor realization, to execute the instructions stored on the memory storage device 522. In some embodiments, the controller 520 may be realized as an apps processor, a DSP processor, a modem processor, dedicated hardware logic, or any combination thereof. Where implemented, at least in part, based on software, each of the modules, depicted in FIG. 5 as being stored on the memory storage device 522, may be stored on a separate RAM memory module, a ROM memory module, an EEPROM memory module, a CD-ROM, a FLASH memory module, a Subscriber Identity Module (SIM) memory, or any other type of memory/storage device, implemented through any appropriate technology. The memory storage 522 may also be implemented directly in hardware. Thus, in some embodiments, the controller 520 may be configured to determine a time-domain signal (e.g., a sub-sequence of one or more symbols transmitted during an interval of time corresponding portion of the captured frame corresponding to the VLC signal transmitted by a particular light source) from a captured image (e.g., captured, for example, by the VLC receiver module 512 of the mobile device 500), to identify from the time-domain signal an at least one decoded symbol (e.g., a sub-sequence that includes one or more symbols), and to determine at least one codeword from a list of candidate codewords based on the identified at least one decoded symbol determined from the time-domain signal and on an inter-symbol time measured between the at least one decoded symbol and an earlier at least one decoded symbol determined from an earlier time-domain signal for an earlier captured image (previously captured by the device 500). In some embodiments, determination of the at least one codeword is based on measured inter-symbol time between two symbol sub-sequences from respective two image frames.

In some embodiments, the controller/processor 520 may also include a location determination engine/module 560 to determine a location of the device 500 or a location of a device that transmitted a VLC signal (e.g., a location of a light source 136 and/or light fixture 130) based, at least in part, on the codeword (identifier) encoded in the VLC signal. For example, in some embodiments, each of the codewords of a codebook may be associated with a corresponding location (provided through data records, which may be maintained at a remote server, or be downloaded to the device 500, associating codewords with locations). In some examples, the location determination module 560 may be used to determine the locations of a plurality of devices (light sources and/or their respective fixtures) that transmit VLC signals, and determine the location of the device 500 based at least in part on the determined locations of the plurality of devices. For example, a possible location(s) of the device may be derived as an intersection of visibility regions corresponding to points from which the light sources identified by the device 500 would be visible by the device 500. In some implementations, the location determination module 560 may derive the position of the device 500 using information derived from various other receivers and modules of the mobile device 500, e.g., based on receive signal strength indication (RSSI) and round trip time (RTT) measurements performed using, for example, the radio frequency receiver and transmitter modules of the device 500.

Figure 12:
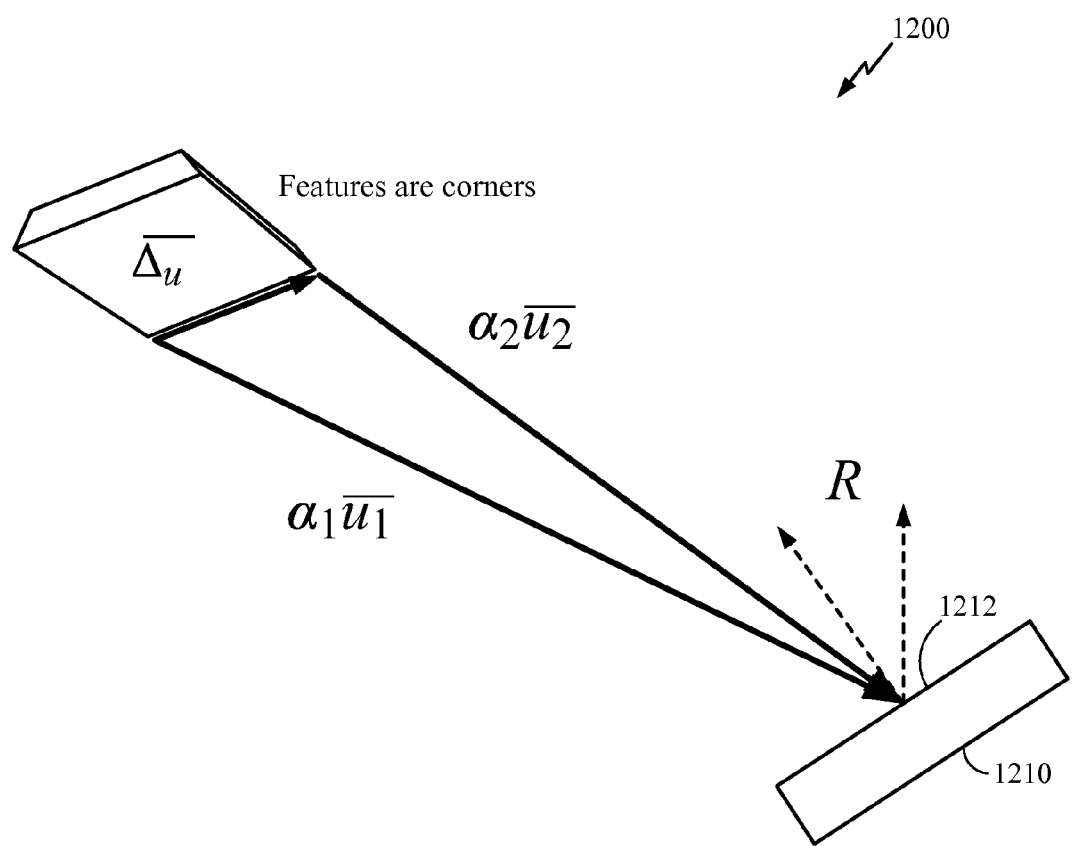
FIG. 12 is a diagram of an example system to determine position of a device.

In some embodiments, physical features such as corners/edges of a light fixture (e.g., a light fixture identified based on the codeword decoded by the mobile device) may be used to achieve cm level accuracy in determining the position of the mobile device. For example, and with reference to FIG. 12 showing a diagram of an example system 1200 that includes an image capture unit 1212 of a mobile device 1210 (which may be similar to the mobile device 500 of FIG. 5), consider a situation where an image is obtained from which two corners of a light fixture (e.g., a fixture transmitting a VLC signal identifying that fixture, with that fixture being associated with a known position) are visible and are detected. In this situation, the direction of arrival of light rays corresponding to each of the identified corners of the light fixture are represented as a unit vector $u'_1$ and $u'_2$ in the device's coordinate system. Based on measurements from the device's various sensors (e.g., measurements from an accelerometer, a gyroscope, a geomagnetic sensor, each of which may be similar to the sensors 530 of the device 500 of FIG. 5), the tilt of the mobile device may be derived/measured, and based on that the rotation matrix R of the device's coordinate system around that of the earth may be derived. The position and orientation of the device may then be derived based on the known locations of the two identified features (e.g., corner features of the identified fixture) by solving for the parameters $\alpha_1$ and $\alpha_2$ in the relationship:

$$\alpha_1 u'_1 + \alpha_2 u'_2 = R^{-1} \Delta'_u,$$

where $\Delta'_u$ is the vector connecting the two known features.

In some examples, the device 500 and/or the controller/processor module 520 may include a navigation module (not shown) that uses a determined location of the device 500 (e.g., as determined based on the known locations of one or more light sources/fixtures transmitting the VLC signals) to implement navigation functionality.

As noted, a VLC signal, transmitted from a particular light source, is received by the VLC receiver module 512, which may be an image sensor with a gradual-exposure mechanism (e.g., a CMOS image sensor with a rolling shutter) configured to capture on a single frame time-dependent image data representative of a scene (a scene that includes a VLC transmitting light source) over some predetermined interval (e.g., the captured scene may correspond to image data captured over 1/30 second), such that different rows contain image data from the same scene but for different times during the pre-determined interval. As further noted, the captured image data may be stored in an image buffer which may be realized as a dedicated memory module of the VLC receiver module (also referred to as the image capture unit) 512, or may be realized on the memory 522 of the device 500. A portion of the captured image will correspond to data representative of the VLC signal transmitted by the particular light source (e.g., the light source 136 of FIG. 1, with the light source comprising, for example, one or more LEDs) in the scene, with a size of that portion based on, for example, the distance and orientation of the VLC receiver module to the light source in the scene. In some situations, the part of the VLC signal may be captured at a low exposure setting of the VLC receiver module 512, so that high frequency pulses are not attenuated.

Having captured an image frame that includes time-dependent data from a scene including the particular light source (or multiple light sources), the VLC decoding module 552, for example, is configured to process the captured image frame to extract symbols encoded in the VLC signal occupying a portion of the captured image (as noted, the size of the portion will depend on the distance from the light source, and/or on the orientation of the VLC receiver module relative to the light source). The symbols extracted represent at least a portion of the codeword (e.g., an identifier) encoded into the VLC signal. In some situations, the symbols extracted may include sequential (e.g., consecutive) symbols of the codeword, while in some situations the sequences of symbols may include at least two non-consecutive sub-sequences of the symbols from a single instance of the codeword, or may include symbol sub-sequences from two transmission frames (which may or may not be adjacent frames) of the light source (i.e., from separate instances of the codeword).

Figure 6:
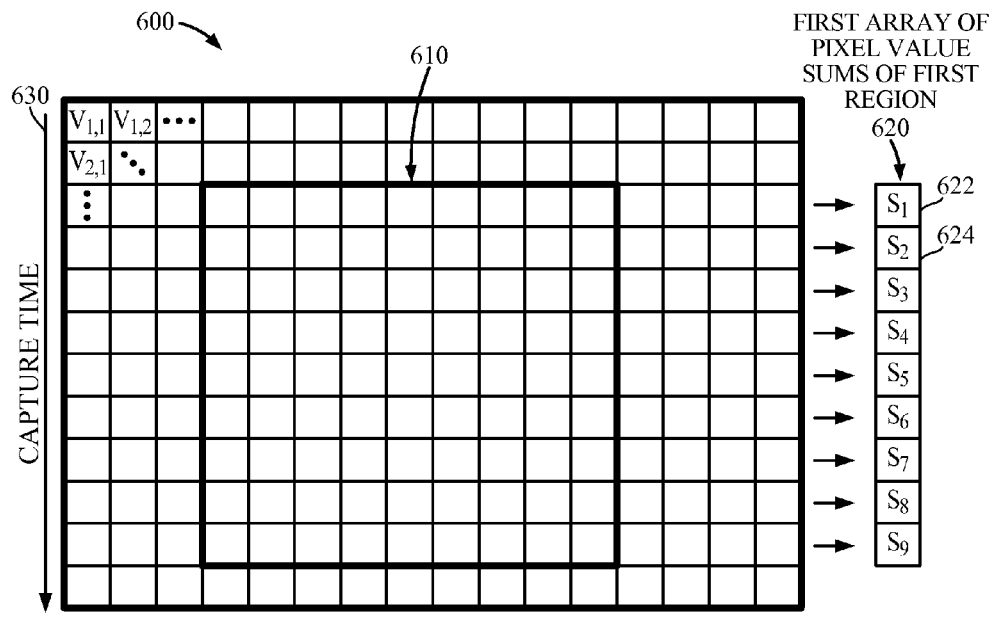
FIGS. 6-7 are illustration of images, captured by a sensor array, that include regions of interest corresponding to a VLC signal transmitted by a light source.

In some embodiments, decoding the symbols from a VLC signal may include determining pixel brightness values from a region of interest in at least one image (the region of interest being a portion of the image corresponding to the light source illumination), and determining timing information associated with the decoded symbols. Determination of pixel values, based on which symbols encoded into the VLC signal can be identified/decoded, is described in relation to FIG. 6 showing a diagram of an example image 600, captured by an image sensor array (such as that found in VLC receiver module 512), that includes a region of interest 610 corresponding to illumination from a light source. In the example illustration of FIG. 6, the image sensor captures an image using an image sensor array of 192 pixels which is represented by 12 rows and 16 columns. Other implementations may use any other image sensor array size (e.g., 307,200 pixels, represented by 480 rows and 640 columns), depending on the desired resolution and on cost considerations. As shown, the region of interest 610 in the example image 600 is visible during a first frame time. In some embodiments, the region of interest may be identified/detected using image processing techniques (e.g., edge detection processes) to identify areas in the captured image frame with particular characteristics, e.g., a rectangular area with rows of pixels of substantially uniform values. For the identified region of interest 610, an array 620 of pixel sum values is generated. Vertical axis 630 corresponds to capture time; and the rolling shutter implementation in the image capture unit results in different rows of pixels corresponding to different times.

Each pixel in the image 600 captured by the image sensor array includes a pixel value representing energy recovered corresponding to that pixel during exposure. For example, the pixel of row 1 and column 1 has pixel value $V_{1,1}$. As noted, the region of interest 610 is an identified region of the image 600 in which the VLC signal is visible during the first frame. In some embodiments, the region of interest is identified based on comparing individual pixel values, e.g., an individual pixel luma value, to a threshold and identifying pixels with values which exceed the threshold, e.g., in a contiguous rectangular region in the image sensor. In some embodiments, the threshold may be 50% the average luma value of the image 600. In some embodiments, the threshold may be dynamically adjusted, e.g., in response to a failure to identify a first region or a failure to successfully decode information being communicated by a VLC signal in the region 610.

The pixel sum values array 620 is populated with values corresponding to sum of pixel values in each row of the identified region of interest 610. Each element of the array 620 may correspond to a different row of the region of interest 610. For example, array element $S_1$ 622 represents the sum of pixel values (in the example image 600) of the first row of the region of interest 610 (which is the third row of the image 600), and thus includes the value that is the sum of $V_{3,4}$, $V_{3,5}$, $V_{3,6}$, $V_{3,7}$, $V_{3,8}$, $V_{3,9}$, $V_{3,10}$, $V_{3,11}$, and $V_{3,12}$. Similarly, the array element $S_2$ 624 represents the sum of pixel values of the second row of the region of interest 610 (which is row 4 of the image 600) of $V_{4,4}$, $V_{4,5}$, $V_{4,6}$, $V_{4,7}$, $V_{4,8}$, $V_{4,9}$, $V_{4,10}$, $V_{4,11}$, and $V_{4,12}$.

Array element 622 and array element 624 correspond to different sample times as the rolling shutter advances. The array 620 is used to recover a VLC signal being communicated. In some embodiments, the VLC signal being communicated is a signal tone, e.g., one particular frequency in a set of predetermined alternative frequencies, during the first frame, and the single tone corresponds to a particular bit pattern in accordance with known predetermined tone-to-symbol mapping information.

Figure 7:
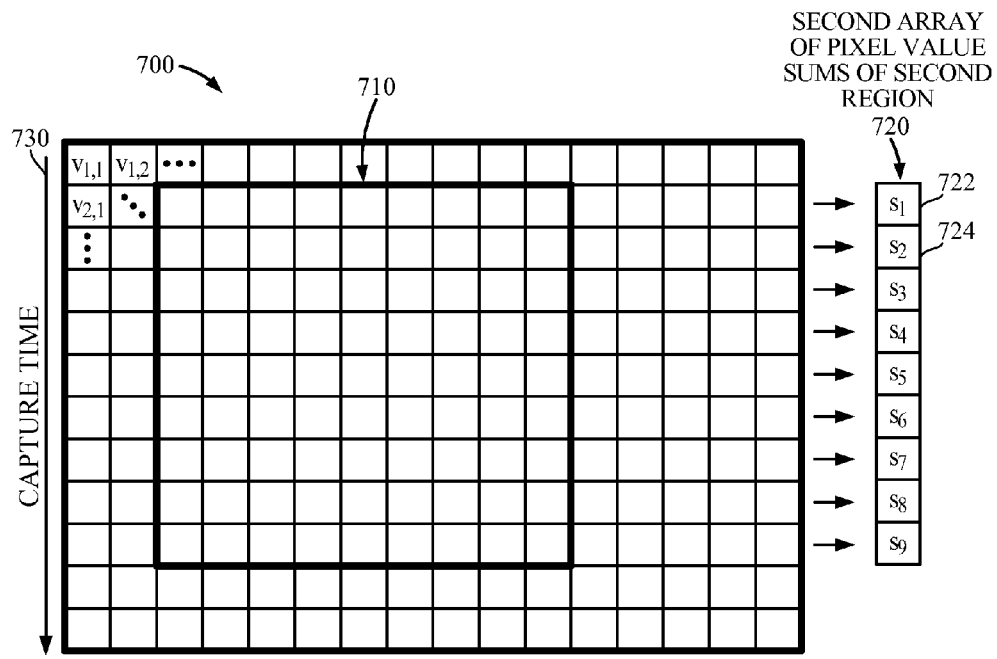

FIG. 7 is a diagram of another example image 700 captured by the same image sensor (which may be part of the VLC receiver module 512) that captured the image 600 of FIG. 6, but at a subsequent time interval to the time interval during which image 600 was captured by the image sensor array. The image 700 includes an identified region of interest 710 in which the VLC signal is visible during the second frame time interval, and a corresponding generated array of pixel sum values 720 to sum the pixel values in the rows of the identified region of interest 710. As noted, in situations in which an image captured unit of a moving mobile device (such as a mobile phone) is used to capture the particular light source(s), the dimensions of the region of interests in each of the captured frames may vary as the mobile device changes its distance from the light source and/or its orientation relative to the light source. As can be seen in the example captured image 700 of FIG. 7, the region of interest 710 is closer to the top left corner of the image 700 than the region of interest 610 was to the top left corner of the image 600. The difference in the position of the identified regions of interest 610 and 710, respectively, with reference to the images 600 and 700, may have been the result of a change in the orientation of the mobile device from the time at which the image 600 was being captured and the time at which the image 700 was being captured (e.g., the mobile device, and thus its image sensor, may have moved a bit to the right and down, relative to the light source, thus causing the image of the light source to be closer to the top left corner of the image 700). In some embodiments, the size of first region of interest 610 may be different than the size of the second region of interest 710.

In FIG. 7, a vertical axis 730 corresponds to capture time, and the rolling shutter implementation in the camera results in different rows of pixels corresponding to different times. Here too, the image 700 may have been captured by an image sensor that includes the array of 192 pixels (i.e., the array that was used to capture the image 600), which can be represented by 12 rows and 16 columns.

Each pixel in the image 700 captured by the image sensor array has a pixel value representing energy recovered corresponding to that pixel during exposure. For example, the pixel of row 1, column 1, has pixel value $v_{1,1}$. A region of interest block 710 is an identified region in which the VLC signal is visible during the second frame time interval. As with the image 600, in some embodiments, the region of interest is identified based on comparing individual pixel values to a threshold, and identifying pixels with values which exceed the threshold, e.g., in a contiguous rectangular region in the captured image.

An array 720 of pixel value sums for the region of interest 710 of the image 700 is maintained. Each element of the array 720 corresponds to a different row of the region of interest 710. For example, array element $s_1$ 722 represents the sum of pixel values $v_{2,3}$, $v_{2,4}$, $v_{2,5}$, $v_{2,6}$, $v_{2,7}$, $v_{2,8}$, $v_{2,9}$, $v_{2,10}$, and $v_{2,11}$, while array element $S_2$ 724 represents the sum of pixel values $v_{3,3}$, $v_{3,4}$, $v_{3,5}$, $v_{3,6}$, $v_{3,7}$, $v_{3,8}$, $v_{3,9}$, $V_{3,10}$, and $v_{3,11}$. The array element 722 and the array element 724 correspond to different sample times as the rolling shutter (or some other gradual-exposure mechanism) advances.

Decoded symbols encoded into a VLC signal captured by the image capture unit (and appearing in the region of interest of the captured image) may be determined based, in some embodiments, on the computed values of the sum of pixel values (as provided by, for example, the arrays 620 and 720 shown in FIGS. 6 and 7 respectively). For example, the computed sum values of each row of the region of interest may be compared to some threshold value, and in response to a determination that the sum value exceeds the threshold value (or that the sum is within some range of values), the particular row may be deemed to correspond to part of a pulse of a symbol. The pulse's timing information, e.g., its duration (which, in some embodiments, would be associated with one of the symbols, and thus can be used to decode/identify the symbols from the captured images) is also determined and that timing information is recorded. A determination that a particular pulse has ended may be made if there is a drop (e.g., exceeding some threshold) in the pixel sum value from one row to another. Additionally, in some embodiments, a pulse may be determined to have ended only if there are a certain number of consecutive rows (e.g., 2, 3 or more), following a row with a pixel sum that indicates the row is part of a pulse, that are below a non-pulse threshold (that threshold may be different from the threshold, or value range, used to determine that a row is part of a pulse). The number of consecutive rows required to determine that the current pulse has ended may be based on the size of the region of interest. For example, small regions of interest (in situations where the mobile device may be relatively far from the light source) may require fewer consecutive rows below the non-pulse threshold, than the number of rows required for a larger region of interest, in order to determine that the current pulse in the VLC signal has ended. In addition to determining beginning and end of pulses, the decoding module unit may determine/measure timing information with respect to the pulses. For example, the decoding module 552 may measure the time, e.g., measure relative time, determined based on the speed at which the rolling shutter, or some other gradual-exposure mechanism, advances, and based on the time duration of each image frame captured by the VLC receiver module. For example the relative time corresponding to every row of an image (e.g., time corresponding to one row relative to time of another row in the same or different image frame) may be derived according to the number of frames/second captured by the VLC receiver module 512, the number of rows in every image frame (i.e., the resolution of the image sensor array), the inter-frame interval (e.g., pauses between the capture of one frame and the capture of the next frame), etc.

Turning back to FIG. 5, having decoded one or more symbol sub-sequences for the particular codeword, repeatedly (continually) transmitted by the particular light source and received by the device 500, the codeword identification module 554 is applied to the one or more decoded symbol sub-sequences in order to determine/identify plausible codewords from a known pool/dictionary of codewords. In some implementations, the codeword dictionary may have been downloaded and stored on the device 500. For example, the device may contact a venue server (e.g., via the WLAN receiver and transmitter modules 514 and 532 and/or via the WWAN receiver and transmitter modules 516 and 534) upon entering an area served by the venue server, and request data regarding codewords associated with light sources (in the area) transmitting VLC signals. In some embodiments, at least some of the operations to identify the particular codeword associated with the light source transmitting the VLC signal received by the device 500 may be performed remotely, e.g., by transmitting to a remote server data representative of the decoded symbol sub-sequences from the VLC signal received by the device 500, and with the remote server performing operations to determine plausible candidate codewords (from the codeword dictionary) satisfying the codeword symbol sub-sequence requirement and timing constraints.

A candidate codeword is determined as a plausible codeword when: a) the candidate codeword includes all the currently decoded symbol subsequences (i.e., the symbol sub-sequences would need to appear within the sequence of symbols constituting the candidate codeword), and b) timing information associated with the decoded subsequences satisfies predicted timing values associated with the positions of the decoded sub-sequences within the candidate codeword. In some implementations, identification of the codeword proceeds as follows. The receiving device (e.g., the device 500), or a remote device in communication with the receiving device, is assumed to have the full list of codewords assigned to the light fixtures (or light sources) in the current venue (i.e., the codeword dictionary). As noted, the receiving device, through operations implemented, for example, via the symbol decoding module 552, detects (decodes) non-erased symbols across captured frames, and also determines timing information associated with decoded symbols. For example, in some embodiments, the determined timing information may include inter-symbol times between decoded symbol sub-sequences (e.g., between end, or beginning, of a first decoded sub-sequence of a first frame, and beginning or end of a second symbol sub-sequence of any adjacent or non-adjacent following frame). Let the set of detected symbols on frame k be denoted by $S_k = \{S_k(1), S_k(2), \ldots, S_k(N_k)\}$, and let the inter-symbol time between the last symbol on frame k, e.g., $S_k(N_k)$, and the first symbol on frame k+1, e.g., $S_{k+1}(1)$, be denoted by $T_k$. In some embodiments, the inter-symbol timing information may be measured in seconds (or some fraction of a second). Let the set of all such inter-symbol times be denoted by $T = \{T_1, T_2, \ldots, T_{L-1}\}$, where L is the total number of captured image frames.

For each captured frame, the list of plausible candidate codewords is pruned based upon the set of detected symbol sub-sequences that have been decoded, and based on measured timing information for the decoded symbol sub-sequences (e.g., measured inter-symbol times, in some embodiments). More particularly, before any frames are captured by the receiving device, the list of candidate codewords equals the venue's codebook (codeword dictionary). For example, for the first captured frame, the receiving device 500 is configured to determine/decode $S_1$ (e.g., according to pulse information derived from the currently captured image frame) and then search through the candidate codewords for those codewords that have a sub-sequence of symbols equal to $S_1$, taking into account all possible cyclic shifts of each codeword. The set of codewords that pass the matching test form the new list of candidate of codewords. Thus, in the first iteration, codewords that do not contain $S_1$ are eliminated (Alternatively, the remaining codewords that do include $S_1$ are selected for further processing).

When a second frame is captured (the second frame may immediately follow the first captured frame, or it may be some other, non-adjacent, subsequent frame), the receiver determines the symbol sub-sequence $S_2$, and also determines the inter-symbol time $T_1$ for $S_1$ and $S_2$ (which may be, for this example, the interval between the end of the symbol sub-sequence $S_1$ and the beginning of the symbol sub-sequence $S_2$, but may be, in other embodiments, a different interval definition). The receiving device is configured to generate periodic extension of each codeword in the candidate list, and to search for those codewords which have subsequences $S_1$ and $S_2$, where the sub-sequence $S_1$ in a first occurrence (periodic extension) of the candidate codeword and the sub-sequence $S_2$ in the second occurrence (periodic extension) of the codeword are separated by a predicted time substantially equal to $T_1$. The predicted/expected time, designated as $T_{predicted}$, for a particular candidate codeword may be generated as a sum of pre-determined symbol durations of symbols appearing in the particular candidate codeword between a first position (in the particular candidate codeword) where the sub-sequence $S_1$ is located, and a second position, in the periodic extension of the candidate codeword (e.g., a second occurrence of the particular candidate codeword), where the sub-sequence $S_2$ is located.

Those codewords satisfying the requirement that the decoded sub-sequences (namely, $S_1$ and $S_2$ decoded for the two frames) are contained within the candidate codeword, and satisfying the inter-symbol requirements, are selected to form a refined candidate list from which candidate codewords that did not satisfy the two requirements have effectively been eliminated.

For every new frame k, the operations of decoding symbol sub-sequences for the new frame, measuring timing information, $T_k$, (e.g., inter-symbol timing information) with respect to an earlier symbol sub-sequence ($S_{k-1}$ from the preceding frame, k−1) and the currently decoded symbol sub-sequence ($S_k$), and determining which of the remaining candidate codewords can be eliminated or selected for further processing, are performed. The process is repeated until the list of candidate codewords contains only one codeword. This remaining codeword is deemed to be the codeword transmitted as a VLC signal by the particular light source. It is to be noted that measured and predicted inter-symbol times may be determined for non-adjacent frames.

In some embodiments, the visible rows in a region of interest may not correspond to a full symbol. However, it may be still possible to determine the codeword being transmitted by the light source based on observations of multiple frames and knowledge of timing information associated with different symbols from the pre-determined symbol set from which codewords are constructed. For example, in implementations in which different symbols have different durations, it may be possible to eliminate some of the symbols as corresponding to a currently observed symbol. Thus, if only a single portion of a pulse is observed/decoded in a current captured image frame, and that pulse has timing information indicating that the pulse's duration exceeds a certain value, then all symbols in the symbol set associated with durations shorter than the duration of the current pulse would be eliminated (for the current frame) as possible observed pulses. The candidate codewords that would remain viable would be those that include any of the non-eliminated symbols, and that also satisfy timing requirements over multiple frames (e.g., satisfying an inter-symbol timing test). In some embodiments, the decoding operations, to identify the particular codeword transmitted by the particular light source, may be facilitated by encoding frame boundaries into the signals. In such embodiments, the frame boundaries may be assigned unique signal characteristics (e.g., a unique pulse duration or pulse pattern), and the codeword decoding process may thus be performed based, at least in part, on knowledge of the position of those symbols (e.g., at boundaries of the frames) when those symbols are observed, and based on measured timing information.

Figure 8:
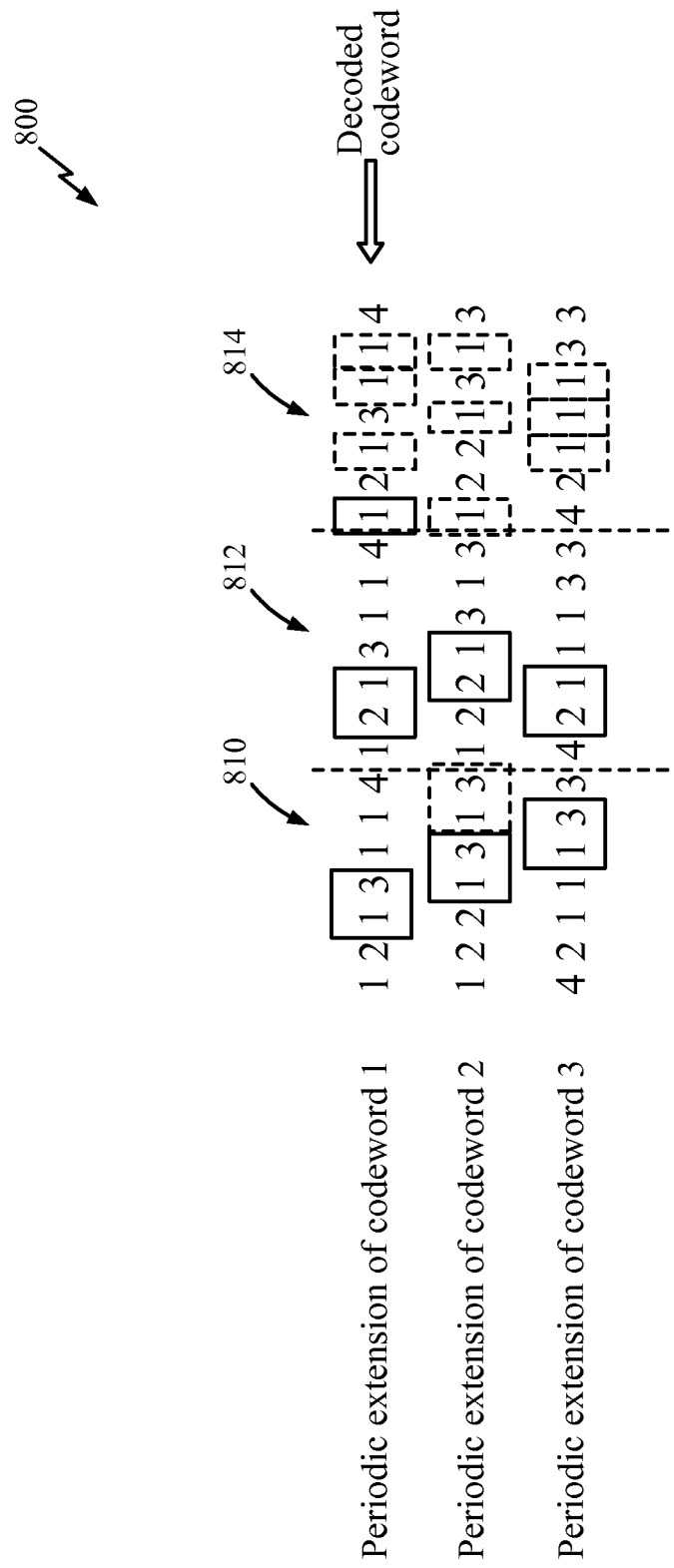
FIG. 8 is a diagram illustrating an example of some operations performed to determine a codeword, from multiple possible codewords, for a VLC signal transmitted by a light source.

To illustrate the codeword identification process (as may be implemented, for example, by of the codeword identification module 554), consider, with reference to FIG. 8, the following example. Assume that a particular light source is transmitting a codeword assigned to it from a three codeword dictionary. Each of the codewords of the dictionary comprises symbols from a 4-symbol set. In the example, the 4-symbol set includes the symbols {1, 2, 3, 4}, with the symbols including the following respective unique pulse durations: {1 µs, 2 µs, 3 µs, 4 µs}. In this example, the symbols have a positive polarity, and thus, the above-specified durations are provided for the logical high portion of the pulses forming the symbols. In some embodiments, however, the symbols may be of negative polarity, or may be defined using different pulse behaviors (e.g., multiple rising edges for one or more of the symbols). The three (3) codeword dictionary may include, for this example, the following codewords: '1213114', '1221313', '4211133' (in some embodiments, however, the codeword dictionary may comprises hundreds, or even thousands of possible codewords).

Assume further that the receiving device has captured three image frames (corresponding to the three repetitions of the particular codeword), and then decoded (e.g., via operation of a decoding module such as the module 552 of FIG. 5) the sub-sequences $S_1=\{1,3\}$, $S_2=\{2, 1\}$, and $S_3=\{1\}$ (different symbol sub-sequences may have been captured due to different distances or orientations of the receiving device from the particular light source). Additionally, assume, for this example, that the measured inter-symbol timing between the end of the a decoded symbol sub-sequence for one frame and the beginning of a symbol sub-sequence of the following frame is measured as $T_1=7$ µs (the inter-symbol timing between frame 1 and frame 2), and $T_2=9$ µs (the inter-symbol timing between frame 2 and frame 3).

Determination of which of the 3-codeword codebook/dictionary is the codeword transmitted by the particular light source, for this example, can be performed as follows. For each of candidate codewords, periodic extensions are generated. For example, extensions 810, 812, and 814, are the period extensions for the codeword 1213114. After the first frame, all three candidate codewords remain in the candidate list because all three codewords have the symbol sub-sequence {1, 3} contained within them (indeed, the second codeword, 1221313, has two occurrences of the sub-sequence {1, 3}).

Subsequently, the receiving device captures a second frame containing a portion of the repeating VLC signal from the light source, and decodes the symbol sub-sequence {2, 1}. Additionally, as noted, the receiving device measures timing information indicating that the second sub-sequence occurs 7 µs after the end of the first sub-sequence {1, 3}. As can be seen, each of the candidate codewords also includes the symbol sub-sequence {2, 1}. Additionally, a predicted inter-symbol time between the first and second frame for each of the candidate codewords is determined. Specifically, the symbols appearing between the end of the first subsequence {1, 3} of the first codeword, and the beginning of the symbol sub-sequence {2, 1} appearing in the second occurrence (second frame) of the codeword 1213114 include the symbols 1, 1, 4, and 1. The predicted inter-symbol time can thus be computed as the sum of the pre-determined durations for the symbols 1, 1, 4, and 1, which is equal to 1 µs+1 µs+4 µs+1 µs=7 µs. Because the predicted inter-symbol time substantially matches the measured inter-symbol time, the first candidate code continues, after the second frame, to be a plausible candidate codeword. Similar computations are made for the second codeword 1221313 to determine predicted inter-symbol times of 7 µs between the end of the first occurrence of {1, 3} in the first frame of the second code and the occurrence of {2, 1} in the second frame, and 3 µs between the end of the second occurrence of {1, 3} in the first frame and the beginning of the sub-sequence {2, 1} in the second frame. In this case, only the predicted inter-symbol timing between the first occurrence of {1, 3} in the first frame and the occurrence of {2, 1} in the second frame substantially matches the measured inter-symbol time of 7 µs. According, only the first occurrence of {1, 3} in the second codeword may be a viable candidate for the symbol sub-sequence {1, 3} that was decoded by the receiving device in the first frame.

With respect to the third candidate codeword, the predicted inter-symbol time between the occurrence of {1, 3} in the first frame and the occurrence of {2, 1} in the second frame is equal to the sum of the pre-determined durations of the symbols between {1, 3} in the first periodic occurrence of the codeword 42111334 and the sub-sequence {2, 1} in the second periodic extension of the codeword 42111334. The symbols appearing between the sub-sequence {1, 3} in the first codeword extension, and the sub-sequence {2, 1} appearing in the second codeword extension include the symbol '3' and '4', which have a predicted durations of 3 µs and 4 µs, for a total predicted inter-symbol time of 7 µs. Because the predicted inter-symbol time between the first and second frame for the third codeword substantially matches the measured inter-symbol time of 7 µs, the third candidate codeword also remains a viable/plausible candidate codeword at the end of the second frame.

It is to be noted that in this example, the inter-frame time (e.g., the time between the end of one frame and the beginning of the next frame) is assumed to be 0. However, in some embodiments, there may be a non-zero inter-frame time (which may be a uniform or non-uniform value). It is additionally to be noted that in determining whether predicted timing information (e.g., predicted inter-symbol time) substantially matches measured timing information (e.g., measured inter-symbol time), some level/degree of tolerance may be used. For example, in some embodiments, ½ of the shortest possible symbol duration (e.g., 0.5 µs) may be used. Thus, in the present example, measured inter-symbol times of 6.5 µs-7.5 µs may be deemed to substantially match a predicted time of 7 µs.

Continuing with the present example, upon receipt and capture of the third frame for the particular transmitted VLC signal from the particular light source, a symbol sub-sequence of {1} is decoded (the light source may be at a distance from the receiving device, or at orientation relative to the receiving device, that enables only a single symbol to be decoded). Additionally, the receiving device measures an inter-symbol timing information between the second and third frame of 9 µs.

As can be seen from FIG. 8, each of the candidate codewords includes a symbol sub-sequence of {1}. Accordingly, based on the first requirement (namely, that a codeword remains a candidate codeword so long that all decoded symbol sub-sequences appear in the candidate codeword), the three codewords remain plausible candidate codewords. As for the timing requirements, the predicted inter-symbol timing between the occurrence of {2, 1} in the second frame and any occurrence of the symbol sub-sequence {1} in the third frame is derived. Particularly, the first codeword has four (4) occurrences of the sub-sequence {1}, giving rise to four different predicted inter-symbol times. The symbols appearing between the occurrence of {2, 1} in the second frame of the first codeword and the first occurrence of the sub-sequence {1} of the third frame include the symbols 3, 1, 1, 4, corresponding to a predicted inter-symbol time of 9 µs. The measured inter-symbol time therefore substantially matches the predicted inter-symbol time for the first occurrence of {1} in the first candidate codeword. The symbols appearing between the occurrence of {2, 1} in the second frame of the first codeword and the second occurrence of the sub-sequence {1} of the third frame include the symbols 3, 1, 1, 4, 1, 2, resulting in a predicted inter-symbol time of 12 µs. This predicted inter-symbol time does not substantially match the measured inter-symbol time between the second and third frame, and thus the second occurrence of the sub-sequence {1} in the third periodic extension of the first codeword cannot correspond to the symbol sub-sequence {1} that was decoded by the receiving device. Similarly, the predicted inter-symbol times for the third and fourth appearances of the sub-sequence {1} in the third periodic extension of the first codeword are 16 µs and 17 µs, respectively. Therefore, the third and fourth occurrences of the sub-sequence {1} in the third periodic extension of the first codeword also cannot correspond to the symbol sub-sequence {1} that was decoded by the receiving device.

Predicted inter-symbol times are also derived for the various occurrences of the sub-sequence {1} appearing in the second and third candidate codewords. The predicted inter-symbol time between a first occurrence of {1} in the third periodic extension of the second codeword 1221313 and the occurrence of {2, 1} in the second periodic extension of the codeword is computed as the sum of the pre-determined durations of the symbols appearing between {2, 1} in the second periodic extension of 1221313 and the first occurrence of the {1} of the third periodic extension (namely, the symbols 3, 1, and 3). That predicted inter-symbol time is thus computed as 7 µs, which does not substantially match the measured inter-symbol time of 9 µs between the second and third frame. The predicted inter-symbol times for second and third occurrences of {1} in the third periodic extensions of the second codeword 1221313 are computed to be 12 µs and 16 µs, which also do not substantially match the measured inter-symbol time of 9 µs. Accordingly, because all the occurrences of the sub-sequence {1} failed the inter-symbol time test, the second codeword is eliminated as a candidate codeword.

The predicted inter-symbol times for the occurrences of {1} in the third periodic extension of the third codeword 4211133 (there are three such occurrence) are derived to be 14 µs, 15 µs, and 16 µs, respectively, and thus, these predicted inter-symbol times are determined not to substantially match the measured inter-symbol time between the second and third frames. Accordingly, the third codeword 4211133 is also eliminated as a possible candidate codeword. Therefore, in the example of FIG. 8, the first codeword 1213114 is determined to be the codeword transmitted by the particular light source.

Thus, based on the foregoing analysis, using only short decoded symbol sub-sequences and timing information pertaining to the decoded symbol sub-sequences, the particular codeword encoded into the VLC signal transmitted by the particular light source can be determined. As noted, in some embodiments, determination of viable codewords from the candidate codewords may also be performed when incomplete pulse portions are observed in some (or all) of the frames. If for a captured frame only a single, incomplete, pulse is observed, at least one of the possible symbols in the symbol set may be eliminated as a possible symbol corresponding to the observable portion of the pulse. In the present example, if the pulse observed had a duration of at least 3 µs, then this pulse could only have corresponded to the symbol '3' (which has a duration of 3 µs) or to the symbol '4' (which has a duration of 4 µs). Based on the observable portions of pulses, and together with measured inter-symbol time information (or other timing information) a determination of the codeword transmitted by the particular light source may be made.

Figure 9:
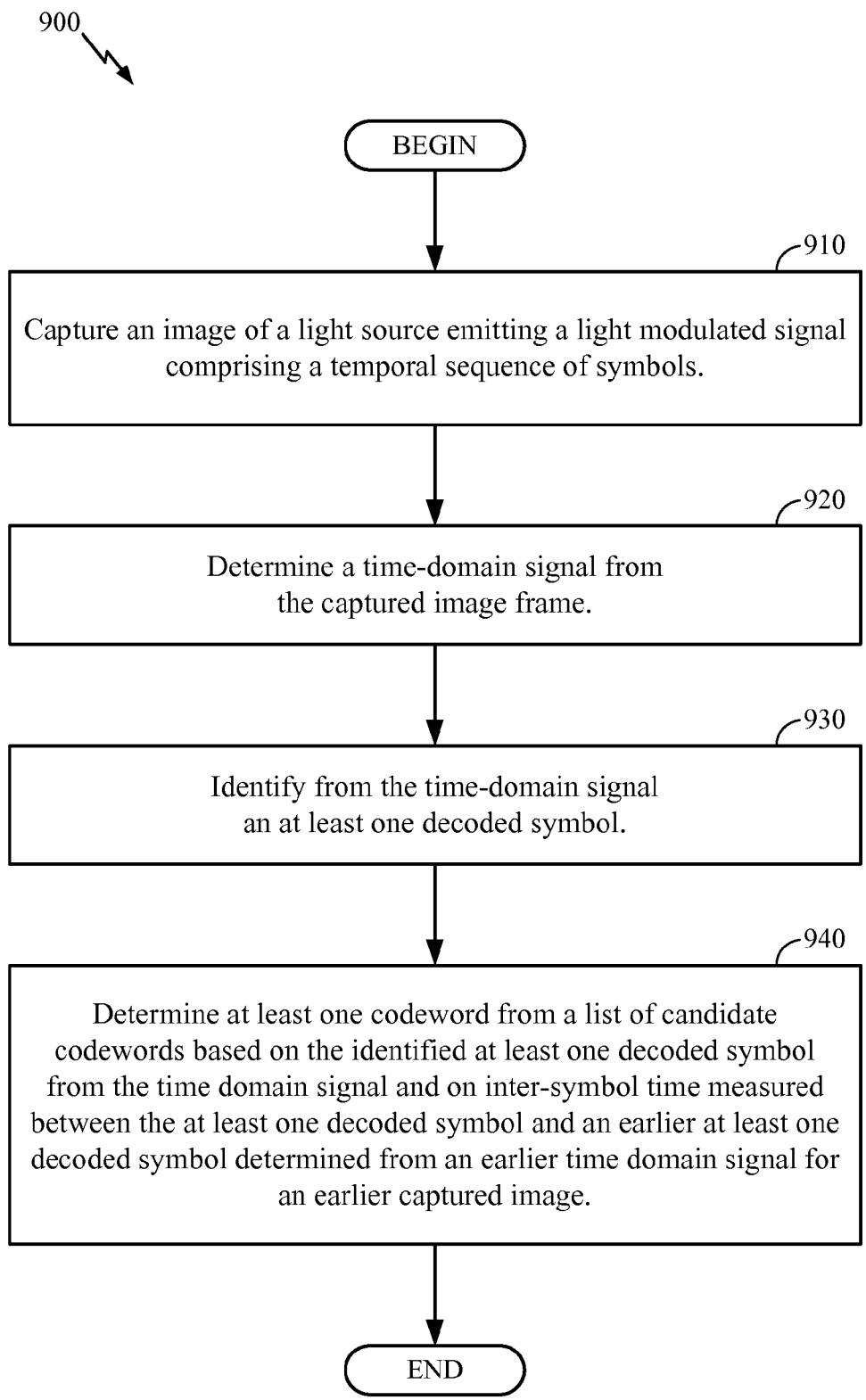
FIG. 9 is a flow chart of an example procedure to determine a codeword transmitted by a light source.

With reference now to FIG. 9, a flow chart of an example procedure 900 to determine a codeword repeatedly transmitted by a light source (such as the light source 136 of the fixture 130 depicted in FIG. 1), as may be implemented in a mobile device such as the any of the mobile devices 120, 220, 500, or other wireless device, is shown. The procedure 900 includes capturing 910, e.g., with an image capture unit, such as found in VLC receiver module 512, that includes a gradual-exposure module (e.g., an image sensor, such as a CMOS image sensor, with a rolling shutter), an image of a light source emitting a light modulated signal comprising a temporal sequence of symbols. As noted, in some embodiments, the light modulated signal may be a VLC signal into which a codeword (which may be uniquely assigned to the particular light source transmitting the codeword, e.g., a light source identifier) is encoded.

From the captured image frame, a time-domain signal is determined 920. Particularly, as noted, the image capture unit captures a time-dependent signal (e.g., the light signal intermittently emitted by the light source according to the particular codeword to be communicated) on a frame through use of the rolling shutter (or some other gradual-exposure mechanism) such that different rows in the captured image frame are captured at different times, with the time associated with the first row of the image and the time associated with the last row of the image defining a frame period. In some embodiments, determining the time-domain signal includes identifying a region of interest corresponding to image data of the light transmitted by the light source. Different rows in the identified region of interest would then correspond to different portions of the time-dependent signal communicated by the light source.

From the time-domain signal, an at least one decoded symbol is identified 930. For example, in some embodiments, decoding the time domain signal may include summing the pixel values in rows of the region of interest (corresponding to the portion of the image frame determined to correspond to light from the light source) and determining if the summed values exceeds some pre-determined threshold (if so, the row is deemed to correspond to a logical 'high', and thus to be part of a pulse associated with a symbol from the codeword being transmitted). The decoding operation also includes, in some embodiments, determining, when the sum of a particular row is less than the pre-determined threshold (that is used to determine if a row is part of a pulse), whether the current pulse has ended. For example, when a pre-determined number of consecutive rows have row sums that are less than the pre-determined threshold, the previous logical High pulse is deemed to have ended. Symbol decoding operations may also include measuring, or otherwise obtaining/determining, relative timing information associated with the rows of the region of interest. Absolute time information may be obtained, but is generally not required because the relative start/end times of pulses, relative to other pulses, is sufficient to perform the codeword identification operations described herein. The timing associated with different pulses can be used to determine the symbol corresponding to those pulses. For example, in some embodiments, different symbols are associated with different pulse durations, and thus, by determining the duration of pulses identified within the region of interest, the symbols corresponding to those pulses can be determined.

Based on the identified symbol sub-sequence, comprising the at least one decoded symbol determined from the time-domain signal, and based on inter-symbol time measured between the at least one decoded symbol and an earlier at least one decoded symbol (determined from an earlier time-domain signal for an earlier captured image), at least one codeword is determined 940 from a list of candidate codewords. As noted, the at least one decoded symbol (i.e., the first decoded symbol described in relation to FIG. 9) and its associated timing information are used to eliminate from consideration a candidate codeword (from a finite codebook available to the device decoding the VLC signal) that does not include the at least one decoded symbol i.e., does not include the symbol sub-sequence comprising the at least one symbol) and/or does not satisfy timing requirements corresponding to the measured timing information. Alternatively, the at least one decoded symbol and associated measured timing information are used to select for further consideration other candidate codewords from the finite codebook of codewords. For example, in some implementations, decoded symbol sub-sequences from different frames (with each sub-sequence comprising at least one symbol), and timing information associated with those sub-sequences, are used to eliminate those candidate codewords that do not include the decoded symbol sub-sequences, or for which the predicted timing information (e.g., inter-symbol timing between the sub-sequences from the different frames) does not match the measured timing information (e.g., the inter-symbol time between the current, first, sub-sequence of symbols and the earlier, second, sub-sequence of symbols). Alternatively, the decoded symbol sub-sequences from the different frames and their associated measured timing information may be used to select for further processing/consideration at least one of the candidate codewords. In some embodiments, the timing information for the at least one decoded symbol and the timing information for the earlier at least one decoded symbol may include edge information (e.g., rising or falling edge information) for the at least one decoded symbol and for the earlier at least one decoded symbol.

Figure 10:
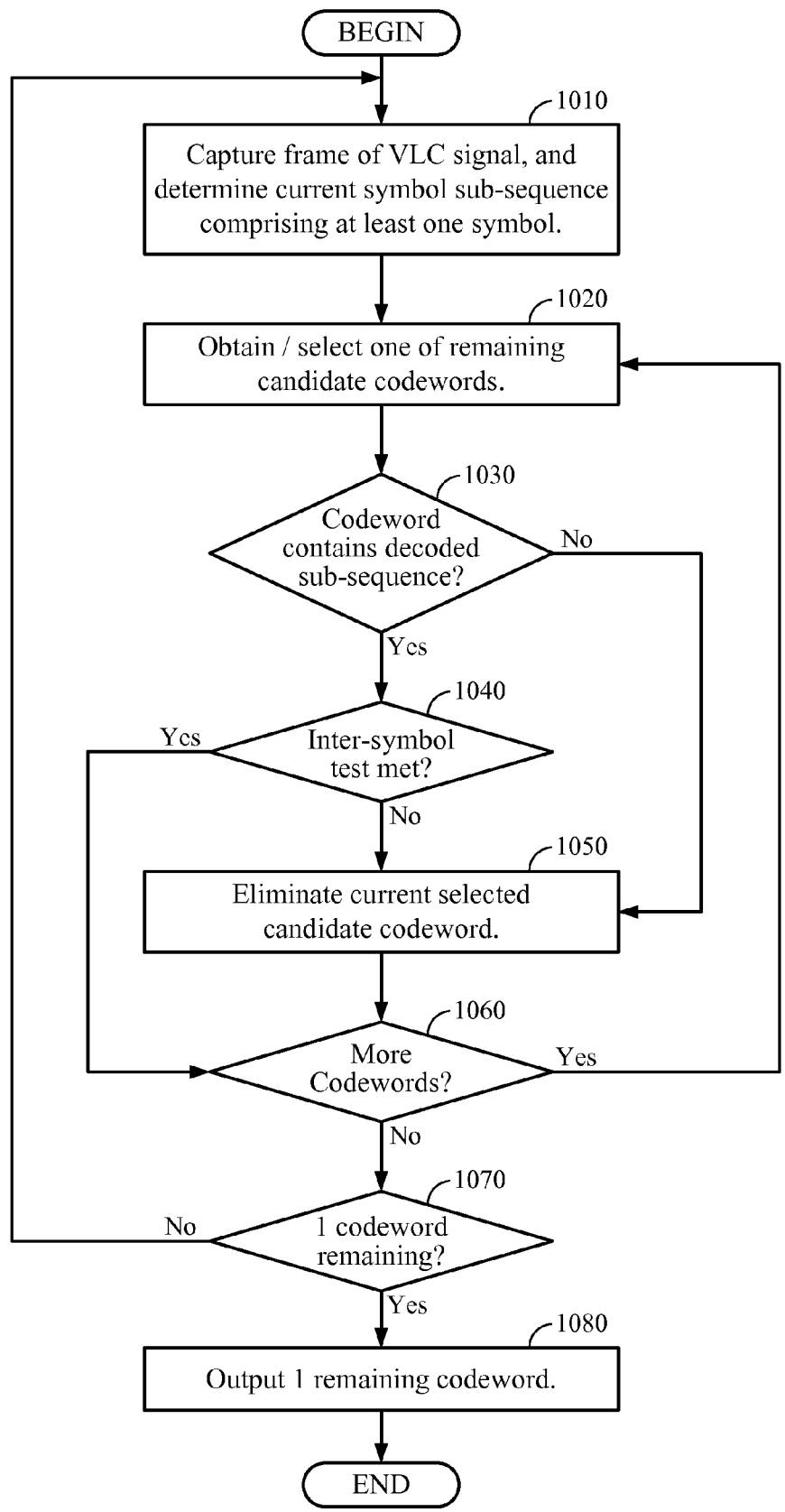
FIG. 10 is a flowchart of an example process for determining a codeword based on decoded symbol sub-sequences and timing information.

An example implementation of a process 1000 for determining at least one candidate codeword (as a plausible codeword that may correspond to the codeword transmitted by the light source) by eliminating or selecting candidate codewords from a codebook based on decoded symbol sub-sequences and associated measured timing information is provided with reference to a flowchart shown in FIG. 10. The process 1000 may be part of the implementation, in some embodiments, of the process 900 depicted in FIG. 9. In some embodiments, the process 1000 depicted in the flowchart of FIG. 10 may be implemented in a mobile device such as the any of the mobile device 120, 220, or 500 shown in FIGS. 1, 2, and 5, respectively. As shown, the process 1000 includes capturing 1010 a frame of the VLC signal that is repeatedly transmitted by the light source, and determining (also at 1010) from the captured frame a symbol sub-sequence (comprising at least one decoded symbol). The capturing and decoding operations illustrated in 1010 of FIG. 10 may be performed similarly to the operations 910-930 shown in FIG. 9.

Once the symbol sub-sequence from the current frame has been decoded, one of the candidate codewords is obtained/selected 1020 from the list of candidate codewords (each of the possible candidate codewords needs to be considered). A determination is then made 1030 for the selected codeword of whether the at least one symbol of the currently decoded symbol sub-sequence is included (e.g., appears) within the candidate codeword (e.g., in the example of FIG. 8, a determination was made, with respect to the second frame, whether the decoded symbol sub-sequence {2, 1} is included or appears in the candidate codeword 1213114). If the current decoded symbol sub-sequence is not contained within the selected candidate codeword, that codeword is eliminated 1050, and a determination is made 1060 of whether there are additional remaining candidate codewords that need to be considered with respect to the currently decoded symbol sub-sequence.

If the current decoded symbol sub-sequence is contained within the candidate codeword, then a determination is made of whether measured timing information substantially matches predicted timing information. For example, a determination is made 1040 whether predicted inter-symbol time between an end of an earlier (previously) obtained decoded symbol sub-sequence (containing an earlier, second, at least one decoded symbol) for an earlier frame and a time for the current decoded symbol sub-sequence substantially matches a measured inter-symbol time (measuring of timing information may be performed, for example, during the capturing and decoding operations at 1010). As noted, in some embodiments, deriving the predicted inter-symbol time may be performed by summing the known pre-determined durations of the symbols appearing in the candidate codeword between the end of the previous decoded sub-sequence of the previous frame, and the beginning of the decoded symbol sub-sequence of the current frame. As also noted, in some embodiments, other timing values associated with the decoded symbol sub-sequences may be measured and/or computed.

If it is determined, at 1040, that the candidate codeword does not satisfy the timing requirement test, the currently selected candidate codeword is eliminated 1050 from further consideration as the possible codeword corresponding to the codeword encoded into the VLC signal transmitted by the light source, and the process proceeds to the determine if there are additional remaining candidate codewords to consider (at 1060). If the timing requirement test is met, the codeword is not eliminated, and instead the process proceeds directly to determine (at 1060) if there are additional candidate codewords to consider.

If it is determined, at 1060, that there are additional candidate codewords with respect to which the checks at 1030 and 1040 need to be made, then the next candidate codeword is selected 1020. When a determination is made that there are no additional candidate codewords to consider (i.e., all candidate codewords that were still viable when the current frame was captured have been examined and considered), a determination is made 1070 of whether only one (1) single codeword remains as a candidate codeword. If there is only one remaining codeword, then that remaining codeword is deemed to be the codeword corresponding to the codeword transmitted by the light source, and that codeword is outputted (e.g., provided to another process, such as a location determination process, for further computation). Although not shown, in situations in which all possible codewords have been eliminated, an error may be reported, and either a further attempt is made to capture new frames in order to determine the codeword encoded into the VLC signal, or further attempts to determine the codeword associated with the present light source are abandoned.

If more than one (1) candidate codeword remains (as determined at 1070), then the next frame is obtained 1010 to thus start the next iteration of the process 1000 in order to identify the codeword associated with the present light source.

Thus, in some embodiments, determining the at least one codeword from the list of candidate codewords may include measuring the inter-symbol time between a time of the at least one decoded symbol for the image and an earlier time of the earlier at least one decoded symbol for the earlier captured image, and identifying from the list of candidate codewords a candidate codeword including the at least one decoded symbol for the image and the earlier at least one decoded symbol for the earlier captured image when the measured inter-symbol time substantially equals a predicted inter-symbol time period between the earlier at least one decoded symbol in a first occurrence of the candidate codeword and the at least one decoded symbol in a second occurrence of the candidate codeword. The predicted inter-symbol time period may be computed based on a sum of pre-determined symbol durations of symbols appearing in the candidate codeword between a first position of the earlier at least one decoded symbol in the first occurrence of the candidate codeword and a second position of the at least one decoded symbol in the second occurrence of the candidate codeword.

As noted, in some embodiments, determination of plausible codewords from the candidate codewords may also be performed when incomplete pulse portions are observed in some (or all) of the frames. For example, when only a single, incomplete, pulse is observed for a current frame, at least one of the possible symbols in the symbol set may be eliminated as a possible symbol corresponding to the observable portion of the pulse. Through this information (i.e., which symbols cannot correspond to a currently observed pulse) and/or using timing information such as inter-symbol time, the actual codeword transmitted from the particular light source transmitting the currently captured VLC signal may be identified. Thus, in some embodiments, decoding a symbol sub-sequence (to identify at least one symbol in a current frame) may include determining duration of a pulse represented in a time-domain signal from a captured image frame, and selecting from a set of possible symbols, with each of the possible symbols associated with a respective pre-determined duration, at least one symbol with an associated pre-determined duration that is at least equal to the determined duration of the pulse occurring in the time-domain signal from the captured image.

Figure 11:
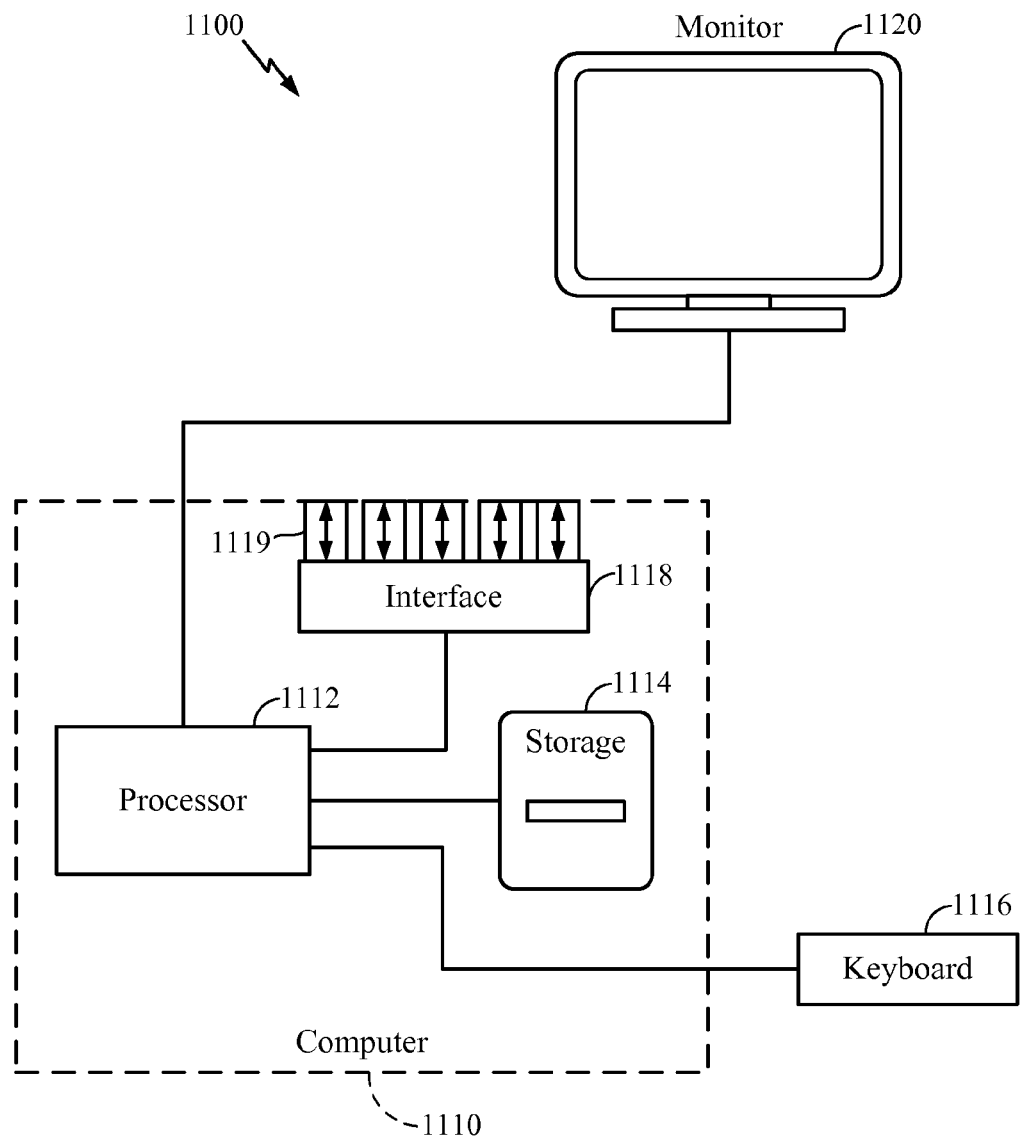
FIG. 11 is a schematic diagram of an example computing system.

Performing the procedures described herein may be facilitated by a processor-based computing system. With reference to FIG. 11, a schematic diagram of an example computing system 1100 is shown. Part or all of the computing system 1100 may be housed in, for example, a handheld mobile device such as the devices 120 and 500 of FIGS. 1 and 5, respectively, or may comprise part or all of the servers, nodes, access points, or base stations described herein, including the light fixture 130 depicted in FIG. 1. The computing system 1100 includes a computing-based device 1110 such as a personal computer, a specialized computing device, a controller, and so forth, that typically includes a central processor unit 1112. In addition to the CPU 1112, the system includes main memory, cache memory and bus interface circuits (not shown). The computing-based device 1110 may include a mass storage device 1114, such as a hard drive and/or a flash drive associated with the computer system. The computing system 1100 may further include a keyboard, or keypad, 1116, and a monitor 1120, e.g., a CRT (cathode ray tube) or LCD (liquid crystal display) monitor, that may be placed where a user can access them (e.g., a mobile device's screen).

The computing-based device 1110 is configured to facilitate, for example, the implementation of one or more of the procedures/processes/techniques described herein (including the procedures to decode symbols of VLC signals, and determine the codewords encoded into the VLC signals). The mass storage device 1114 may thus include a computer program product that when executed on the computing-based device 1110 causes the computing-based device to perform operations to facilitate the implementation of the procedures described herein. The computing-based device may further include peripheral devices to enable input/output functionality. Such peripheral devices may include, for example, a CD-ROM drive and/or flash drive, or a network connection, for downloading related content to the connected system. Such peripheral devices may also be used for downloading software containing computer instructions to enable general operation of the respective system/device. For example, as illustrated in FIG. 11, the computing-based device 1110 may include an interface 1118 with one or more interfacing circuits (e.g., a wireless port that include transceiver circuitry, a network port with circuitry to interface with one or more network device, etc.) to provide/implement communication with remote devices (e.g., so that a wireless device, such as the device 120 of FIG. 1, could communicate, via a port such as the port 1119, with a controller such as the controller 110, or with some other remote device). Alternatively and/or additionally, in some embodiments, special purpose logic circuitry, e.g., an FPGA (field programmable gate array), a DSP processor, or an ASIC (application-specific integrated circuit) may be used in the implementation of the computing system 1100. Other modules that may be included with the computing-based device 1110 are speakers, a sound card, a pointing device, e.g., a mouse or a trackball, by which the user can provide input to the computing system 1100. The computing-based device 1110 may include an operating system.

Computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any non-transitory computer program product, apparatus and/or device (e.g., magnetic discs, optical disks, memory, Programmable Logic Devices (PLDs)) used to provide machine instructions and/or data to a programmable processor, including a non-transitory machine-readable medium that receives machine instructions as a machine-readable signal.

Memory may be implemented within the computing-based device 1110 or external to the device. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate to in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate to in the context of the systems, devices, circuits, methods, and other implementations described herein.

As used herein, including in the claims, "or" as used in a list of items prefaced by "at least one of" or "one or more of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.) Also, as used herein, unless otherwise stated, a statement that a function or operation is "based on" an item or condition means that the function or operation is based on the stated item or condition and may be based on one or more items and/or conditions in addition to the stated item or condition.

As used herein, a mobile device or station (MS) refers to a device such as a cellular or other wireless communication device, a smartphone, tablet, personal communication system (PCS) device, personal navigation device (PND), Personal Information Manager (PIM), Personal Digital Assistant (PDA), laptop or other suitable mobile device which is capable of receiving wireless communication and/or navigation signals, such as navigation positioning signals. The term "mobile station" (or "mobile device" or "wireless device") is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile station" is intended to include all devices, including wireless communication devices, computers, laptops, tablet devices, etc., which are capable of communication with a server, such as via the Internet, WiFi, or other network, and to communicate with one or more types of nodes, regardless of whether satellite signal reception, assistance data reception, and/or position-related processing occurs at the device, at a server, or at another device or node associated with the network. Any operable combination of the above are also considered a "mobile station." A mobile device may also be referred to as a mobile terminal, a terminal, a user equipment (UE), a device, a Secure User Plane Location Enabled Terminal (SET), a target device, a target, or by some other name.

The detailed description set forth above in connection with the appended drawings is provided to enable a person skilled in the art to make or use the disclosure. It is contemplated that various substitutions, alterations, and modifications may be made without departing from the spirit and scope of the disclosure. Throughout this disclosure the term "example" indicates an example or instance and does not imply or require any preference for the noted example. The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments. Thus, the disclosure is not to be limited to the examples and designs described herein but is to be accorded the widest scope consistent with the principles and novel features disclosed herein.

Although particular embodiments have been disclosed herein in detail, this has been done by way of example for purposes of illustration only, and is not intended to be limiting with respect to the scope of the appended claims, which follow. Other aspects, advantages, and modifications are considered to be within the scope of the following claims. The claims presented are representative of the embodiments and features disclosed herein. Other unclaimed embodiments and features are also contemplated. Accordingly, other embodiments are within the scope of the following claims.

What is claimed is:

1. A method to decode a visible light communication (VLC) signal, the method comprising:
 capturing an image of a light source emitting a light modulated signal comprising a temporal sequence of symbols;
 determining a time-domain signal from the captured image;
 identifying from the time-domain signal an at least one decoded symbol from a set of possible symbols based, at least in part, on known pre-determined durations associated with each of the possible symbols; and
 determining at least one codeword from a list of candidate codewords based on the identified at least one decoded symbol from the time-domain signal and on an inter-symbol time measured between the at least one decoded symbol and an earlier at least one decoded symbol determined from an earlier time-domain signal from an earlier captured image.

2. The method of claim 1, wherein determining the at least one codeword from the list of candidate codewords comprises:
 eliminating a first codeword from the list of candidate codewords based on the identified at least one decoded symbol, or selecting a second codeword from the list of candidate codewords for further processing based on the identified at least one decoded symbol and on the measured inter-symbol time.

3. The method of claim 1, wherein capturing the image of the light source comprises:
 capturing the image of the light source with a CMOS camera including a rolling shutter.

4. The method of claim 1, further comprising:
 measuring the inter-symbol time according to edge information for the at least one decoded symbol and for the earlier at least one decoded symbol.

5. The method of claim 1, wherein determining the at least one codeword comprises:
 measuring the inter-symbol time between a time of the at least one decoded symbol for the image and an earlier time of the earlier at least one decoded symbol for the earlier captured image; and
 identifying from the list of candidate codewords a candidate codeword including the at least one decoded symbol for the image and the earlier at least one decoded symbol for the earlier captured image when the measured inter-symbol time substantially equals a predicted inter-symbol time period between the earlier at least one decoded symbol in a first occurrence of the candidate codeword and the at least one decoded symbol in a second occurrence of the candidate codeword, the predicted inter-symbol time period computed based on a sum of pre-determined symbol durations of symbols appearing in the candidate codeword between a first position of the earlier at least one decoded symbol in the first occurrence of the candidate codeword and a second position of the at least one decoded symbol in the second occurrence of the candidate codeword.

6. The method of claim 1, wherein identifying from the time-domain signal the at least one decoded symbol comprises:
 determining duration of a pulse occurring in the time-domain signal from the captured image; and
 selecting from the set of possible symbols, with each of the possible symbols associated with a respective one of the known pre-determined durations, at least one symbol with an associated pre-determined duration that is at least equal to the determined duration of the pulse occurring in the time-domain signal.

7. The method of claim 1, wherein determining the at least one codeword from the list of candidate codewords comprises:
 eliminating the at least one codeword based further on the earlier at least one decoded symbol identified in the earlier time-domain signal determined from the earlier captured image of the light source emitting the light modulated signal.

8. The method of claim 1, further comprising:
 measuring the inter-symbol time, including measuring a symbol start time of the at least one decoded symbol relative to an image start time for the image.

9. The method of claim 8, wherein measuring the inter-symbol time further comprises:
 measuring an end time of the earlier at least one decoded symbol relative to an earlier image start time for the earlier captured image.

10. The method of claim 1, further comprising:
 outputting a decoded codeword when the at least one codeword determined from the list of candidate codewords contains only one remaining candidate codeword, the decoded codeword being the one remaining codeword.

11. A mobile device comprising:
 an image capture unit including a gradual-exposure module configured to capture an image of a light source emitting a light modulated signal comprising a temporal sequence of symbols;
 memory configured to store the captured image; and
 one or more processors coupled to the memory and the image capture unit, and configured to:
  determine a time-domain signal from the captured image;
  identify from the time-domain signal an at least one decoded symbol from a set of possible symbols based, at least in part, on known pre-determined durations associated with each of the possible symbols; and
  determine at least one codeword from a list of candidate codewords based on the identified at least one decoded symbol from the time-domain signal and on an inter-symbol time measured between the at least one decoded symbol and an earlier at least one decoded symbol determined from an earlier time-domain signal for an earlier captured image.

12. The mobile device of claim 11, wherein the one or more processors configured to determine the at least one codeword from the list of candidate codewords are configured to:
 eliminate a first codeword from the list of candidate codewords based on the identified at least one decoded symbol, or select a second codeword from the list of candidate codewords for further processing based on the identified at least one decoded symbol and on the measured inter-symbol time.

13. The mobile device of claim 11, wherein the image capture unit including the gradual-exposure module comprises a CMOS camera including a rolling shutter.

14. The mobile device of claim 11, wherein the one or more processors configured to determine the at least one codeword are configured to:
   measure the inter-symbol time between a time of the at least one decoded symbol for the image and an earlier time of the earlier at least one decoded symbol for the earlier captured image; and
   identify from the list of candidate codewords a candidate codeword including the at least one decoded symbol for the image and the earlier at least one decoded symbol for the earlier captured image when the measured inter-symbol time substantially equals a predicted inter-symbol time period between the earlier at least one decoded symbol in a first occurrence of the candidate codeword and the at least one decoded symbol in a second occurrence of the candidate codeword, the predicted inter-symbol time period computed based on a sum of pre-determined symbol durations of symbols appearing in the candidate codeword between a first position of the earlier at least one decoded symbol in the first occurrence of the candidate codeword and a second position of the at least one decoded symbol in the second occurrence of the candidate codeword.

15. The mobile device of claim 11, wherein the one or more processors configured to identify from the time-domain signal the at least one decoded symbol are configured to:
   determine duration of a pulse occurring in the time-domain signal from the captured image; and
   select from the set of possible symbols, with each of the possible symbols associated with a respective one of the known pre-determined durations, at least one symbol with an associated pre-determined duration that is at least equal to the determined duration of the pulse occurring in the time-domain signal.

16. The mobile device of claim 11, wherein the one or more processors are further configured to:
   measure the inter-symbol time, including measure a symbol start time of the at least one decoded symbol relative to an image start time for the image, and measure an end time of the earlier at least one decoded symbol relative to an earlier image start time for the earlier captured image.

17. The mobile device of claim 11, wherein the one or more processors are further configured to:
   output a decoded codeword when the at least one codeword determined from the list of candidate codewords contains only one remaining candidate codeword, the decoded codeword being the one remaining codeword.

18. An apparatus comprising:
   means for capturing an image of a light source emitting a light modulated signal comprising a temporal sequence of symbols, the means for capturing including a gradual-exposure module;
   means for determining a time-domain signal from the captured image;
   means for identifying from the time-domain signal an at least one decoded symbol; and
   means for determining at least one codeword from a list of candidate codewords based on the identified at least one decoded symbol from the time-domain signal and on an inter-symbol time measured between the at least one decoded symbol and an earlier at least one decoded symbol determined from an earlier time-domain signal for an earlier captured image.

19. The apparatus of claim 18, wherein the means for determining the at least one codeword from the list of candidate codewords comprises:
   means for eliminating a first codeword from the list of candidate codewords based on the identified at least one decoded symbol, or means for selecting a second codeword from the list of candidate codewords for further processing based on the identified at least one decoded symbol and on the measured inter-symbol time.

20. The apparatus of claim 18, wherein the means for identifying the at least one decoded symbol comprises:
   means for identifying the at least one decoded symbol from a set of possible symbols based, at least in part, on known pre-determined durations associated with each of the possible symbols.

21. The apparatus of claim 18, wherein the means for determining the at least one codeword comprises:
   means for measuring the inter-symbol time between a time for the at least one decoded symbol of the image and an earlier time of the earlier at least one decoded symbol for the earlier captured image; and
   means for identifying from the list of candidate codewords a candidate codeword including the at least one decoded symbol for the image and the earlier at least one decoded symbol for the earlier captured image when the measured inter-symbol time substantially equals a predicted inter-symbol time period between the earlier at least one decoded symbol in a first occurrence of the candidate codeword and the at least one decoded symbol in a second occurrence of the candidate codeword, the predicted inter-symbol time period computed based on a sum of pre-determined symbol durations of symbols appearing in the candidate codeword between a first position of the earlier at least one decoded symbol in the first occurrence of the candidate codeword and a second position of the at least one decoded symbol in the second occurrence of the candidate codeword.

22. The apparatus of claim 18, wherein the means for identifying from the time-domain signal the at least one decoded symbol comprises:
   means for determining duration of a pulse occurring in the time-domain signal from the captured image; and
   means for selecting from a set of possible symbols, with each of the possible symbols associated with a respective pre-determined duration, at least one symbol with an associated pre-determined duration that is at least equal to the determined duration of the pulse occurring in the time-domain signal.

23. The apparatus of claim 18, further comprising:
   means for outputting a decoded codeword when the at least one codeword determined from the list of candidate codewords contains only one remaining candidate codeword, the decoded codeword being the one remaining codeword.

24. A non-transitory computer readable media programmed with instructions, executable on a processor, to:
   capture an image of a light source emitting a light modulated signal comprising a temporal sequence of symbols;
   determine a time-domain signal from the captured image;
   identify from the time-domain signal an at least one decoded symbol from a set of possible symbols based, at least in part, on known pre-determined durations associated with each of the possible symbols; and determine at least one codeword from a list of candidate codewords based on the identified at least one decoded symbol from the time-domain signal and on an inter-symbol time measured between the at least one decoded symbol and an earlier at least one decoded symbol determined from an earlier time-domain signal for an earlier captured image.

25. The computer readable media of claim 24, wherein the instructions to determine the at least one codeword from the list of candidate codewords comprise one or more instructions to:

eliminate a first codeword from the list of candidate codewords based on the identified at least one decoded symbol, or select a second codeword from the list of candidate codewords for further processing based on the identified first at least one decoded symbol and on the measured inter-symbol time.

26. The computer readable media of claim 24, wherein the instructions to determine the at least one codeword comprise one or more instructions to:

measure the inter-symbol time between a time of the at least one decoded symbol for the image and an earlier time of the earlier at least one decoded symbol for the earlier captured image; and identify from the list of candidate codewords a candidate codeword including the at least one decoded symbol for the image and the earlier at least one decoded symbol for the earlier captured image when the measured inter-symbol time substantially equals a predicted inter-symbol time period between the earlier at least one decoded symbol in a first occurrence of the candidate codeword and the at least one decoded symbol in a second occurrence of the candidate codeword, the predicted inter-symbol time period computed based on a sum of pre-determined symbol durations of symbols appearing in the candidate codeword between a first position of the earlier at least one decoded symbol in the first occurrence of the candidate codeword and a second position of the at least one decoded symbol in the second occurrence of the candidate codeword.

27. The computer readable media of claim 24, wherein the instructions to identify from the time-domain signal the at least one decoded symbol comprise one or more instructions to:

determine duration of a pulse occurring in the time-domain signal from the captured image; and select from the set of possible symbols, with each of the possible symbols associated with a respective one of the known pre-determined durations, at least one symbol with an associated pre-determined duration that is at least equal to the determined duration of the pulse occurring in the time-domain signal.

28. A method to decode a visible light communication (VLC) signal, the method comprising:

capturing an image of a light source emitting a light modulated signal comprising a temporal sequence of symbols;

determining a time-domain signal from the captured image;

identifying from the time-domain signal an at least one decoded symbol; and determining at least one codeword from a list of candidate codewords based on the identified at least one decoded symbol from the time-domain signal and on an inter-symbol time measured between the at least one decoded symbol and an earlier at least one decoded symbol determined from an earlier time-domain signal from an earlier captured image, wherein determining the at least one codeword from the list of candidate codewords comprises:

eliminating a first codeword from the list of candidate codewords based on the identified at least one decoded symbol, or selecting a second codeword from the list of candidate codewords for further processing based on the identified at least one decoded symbol and on the measured inter-symbol time.

29. The method of claim 28, wherein identifying from the time-domain signal the at least one decoded symbol comprises:

identifying from the time-domain signal the at least one decoded symbol from a set of possible symbols based, at least in part, on known pre-determined durations associated with each of the possible symbols.

30. The method of claim 28, wherein determining the at least one codeword comprises:

measuring the inter-symbol time between a time of the at least one decoded symbol for the image and an earlier time of the earlier at least one decoded symbol for the earlier captured image; and identifying from the list of candidate codewords a candidate codeword including the at least one decoded symbol for the image and the earlier at least one decoded symbol for the earlier captured image when the measured inter-symbol time substantially equals a predicted inter-symbol time period between the earlier at least one decoded symbol in a first occurrence of the candidate codeword and the at least one decoded symbol in a second occurrence of the candidate codeword, the predicted inter-symbol time period computed based on a sum of pre-determined symbol durations of symbols appearing in the candidate codeword between a first position of the earlier at least one decoded symbol in the first occurrence of the candidate codeword and a second position of the at least one decoded symbol in the second occurrence of the candidate codeword.

31. The method of claim 28, wherein identifying from the time-domain signal the at least one decoded symbol comprises:

determining duration of a pulse occurring in the time-domain signal from the captured image; and selecting from a set of possible symbols, with each of the possible symbols associated with a respective pre-determined duration, at least one symbol with an associated pre-determined duration that is at least equal to the determined duration of the pulse occurring in the time-domain signal.

32. The method of claim 28, further comprising:

measuring the inter-symbol time, including measuring a symbol start time of the at least one decoded symbol relative to an image start time for the image; and measuring an end time of the earlier at least one decoded symbol relative to an earlier image start time for the earlier captured image.

33. A mobile device comprising:

an image capture unit including a gradual-exposure module configured to capture an image of a light source emitting a light modulated signal comprising a temporal sequence of symbols;

memory configured to store the captured image; and one or more processors coupled to the memory and the image capture unit, and configured to:

determine a time-domain signal from the captured image;

identify from the time-domain signal an at least one decoded symbol; and determine at least one codeword from a list of candidate codewords based on the identified at least one decoded symbol from the time-domain signal and on an inter-symbol time measured between the at least one decoded symbol and an earlier at least one decoded symbol determined from an earlier time-domain signal for an earlier captured image, wherein the one or more processors configured to determine the at least one codeword from the list of candidate codewords are configured to:

eliminate a first codeword from the list of candidate codewords based on the identified at least one decoded symbol, or select a second codeword from the list of candidate codewords for further processing based on the identified at least one decoded symbol and on the measured inter-symbol time.

34. The mobile device of claim 33, wherein the one or more processors configured to identify from the time-domain signal the at least one decoded symbol are configured to:

identify the at least one decoded symbol from a set of possible symbols based, at least in part, on known pre-determined durations associated with each of the possible symbols.

35. The mobile device of claim 33, wherein the one or more processors configured to determine the at least one codeword are configured to:

measure the inter-symbol time between a time of the at least one decoded symbol for the image and an earlier time of the earlier at least one decoded symbol for the earlier captured image; and identify from the list of candidate codewords a candidate codeword including the at least one decoded symbol for the image and the earlier at least one decoded symbol for the earlier captured image when the measured inter-symbol time substantially equals a predicted inter-symbol time period between the earlier at least one decoded symbol in a first occurrence of the candidate codeword and the at least one decoded symbol in a second occurrence of the candidate codeword, the predicted inter-symbol time period computed based on a sum of pre-determined symbol durations of symbols appearing in the candidate codeword between a first position of the earlier at least one decoded symbol in the first occurrence of the candidate codeword and a second position of the at least one decoded symbol in the second occurrence of the candidate codeword.

36. The mobile device of claim 33, wherein the one or more processors configured to identify from the time-domain signal the at least one decoded symbol are configured to:

determine duration of a pulse occurring in the time-domain signal from the captured image; and select from a set of possible symbols, with each of the possible symbols associated with a respective pre-determined duration, at least one symbol with an associated pre-determined duration that is at least equal to the determined duration of the pulse occurring in the time-domain signal.

37. The mobile device of claim 33, wherein the one or more processors are further configured to:

measure the inter-symbol time, including measure a symbol start time of the at least one decoded symbol relative to an image start time for the image, and measure an end time of the earlier at least one decoded symbol relative to an earlier image start time for the earlier captured image.

38. A non-transitory computer readable media programmed with instructions, executable on a processor, to:

capture an image of a light source emitting a light modulated signal comprising a temporal sequence of symbols;

determine a time-domain signal from the captured image;

identify from the time-domain signal an at least one decoded symbol; and determine at least one codeword from a list of candidate codewords based on the identified at least one decoded symbol from the time-domain signal and on an inter-symbol time measured between the at least one decoded symbol and an earlier at least one decoded symbol determined from an earlier time-domain signal for an earlier captured image, wherein the instructions to determine the at least one codeword from the list of candidate codewords comprise one or more instructions to:

eliminate a first codeword from the list of candidate codewords based on the identified at least one decoded symbol, or select a second codeword from the list of candidate codewords for further processing based on the identified first at least one decoded symbol and on the measured inter-symbol time.

39. The computer readable media of claim 38, wherein the instructions to identify from the time-domain signal the at least one decoded symbol comprise one or more instructions to identify the at least one decoded symbol from a set of possible symbols based, at least in part, on known pre-determined durations associated with each of the possible symbols.

40. The computer readable media of claim 38, wherein the instructions to determine the at least one codeword comprise one or more instructions to:

measure the inter-symbol time between a time of the at least one decoded symbol for the image and an earlier time of the earlier at least one decoded symbol for the earlier captured image; and identify from the list of candidate codewords a candidate codeword including the at least one decoded symbol for the image and the earlier at least one decoded symbol for the earlier captured image when the measured inter-symbol time substantially equals a predicted inter-symbol time period between the earlier at least one decoded symbol in a first occurrence of the candidate codeword and the at least one decoded symbol in a second occurrence of the candidate codeword, the predicted inter-symbol time period computed based on a sum of pre-determined symbol durations of symbols appearing in the candidate codeword between a first position of the earlier at least one decoded symbol in the first occurrence of the candidate codeword and a second position of the at least one decoded symbol in the second occurrence of the candidate codeword.

41. The computer readable media of claim 38, wherein the instructions to identify from the time-domain signal the at least one decoded symbol comprise one or more instructions to:

determine duration of a pulse occurring in the time-domain signal from the captured image; and select from a set of possible symbols, with each of the possible symbols associated with a respective pre-determined duration, at least one symbol with an associated pre-determined duration that is at least equal to the determined duration of the pulse occurring in the time-domain signal.

\* \* \* \* \*